(12) United States Patent
Esser et al.

(10) Patent No.: US 8,757,800 B2
(45) Date of Patent: Jun. 24, 2014

(54) METHOD FOR OPTIMIZING A SPECTACLE LENS

(75) Inventors: Gregor Esser, Munich (DE); Wolfgang Becken, Munich (DE); Helmut Altheimer, Baisweil-Lauchdorf (DE); Anne Seidemann, Munich (DE); Dietmar Uttenweiler, Icking (DE); Werner Mueller, Oetisheim (DE); Edda Wehner, Emmering (DE)

(73) Assignee: Rodenstock GmbH, Munich (DE)

( * ) Notice: Subject to any disclaimer, the term of this patent is extended or adjusted under 35 U.S.C. 154(b) by 1351 days.

(21) Appl. No.: 12/524,315

(22) PCT Filed: Jan. 25, 2008

(86) PCT No.: PCT/EP2008/000588
§ 371 (c)(1),
(2), (4) Date: Jan. 28, 2010

(87) PCT Pub. No.: WO2008/089999
PCT Pub. Date: Jul. 31, 2008

(65) Prior Publication Data
US 2010/0145489 A1    Jun. 10, 2010

(30) Foreign Application Priority Data
Jan. 25, 2007    (DE) .......................... 10 2007 003 857

(51) Int. Cl.
*G02C 7/02* (2006.01)
(52) U.S. Cl.
CPC ..................................... *G02C 7/027* (2013.01)
USPC .................................................... 351/159.76
(58) Field of Classification Search
USPC ....................................... 351/159.73–159.77
See application file for complete search history.

(56) References Cited

U.S. PATENT DOCUMENTS 6,655,803 B1 * 12/2003 Rubinstein et al. ...... 351/159.74
6,755,524 B2 * 6/2004 Rubinstein et al. ...... 351/159.74
(Continued)

FOREIGN PATENT DOCUMENTS

DE         103 13 275 A1    10/2004
DE    10 2005 057 533 A1     6/2007
(Continued)

OTHER PUBLICATIONS

International Search Report dated May 9, 2008 (Three (3) pages).
(Continued)

*Primary Examiner* — Scott J Sugarman
*Assistant Examiner* — Robert E Tallman
(74) *Attorney, Agent, or Firm* — Crowell & Moring LLP

(57) ABSTRACT

The invention relates to a method, a computer program product and a system for designing or producing a spectacle lens for a spectacle wearer. Said method consists of the following steps: individual user data or application data of the spectacle wearer is obtained; the design concept for the spectacle lens having a plurality of evaluation points is determined; a main beam path through the plurality of evaluation points is determined; a local wavefront is specified for each of the main beams in the surroundings of the respective main beam; optical properties of the spectacle lens are determined on the evaluation points by determining an influence of the spectacle lens on the local wavefronts in the surroundings of the respective evaluation point; and the design concept is evaluated in accordance with the determined optical properties and the individual user data.

20 Claims, 12 Drawing Sheets

(56) References Cited

U.S. PATENT DOCUMENTS

Figure 1:
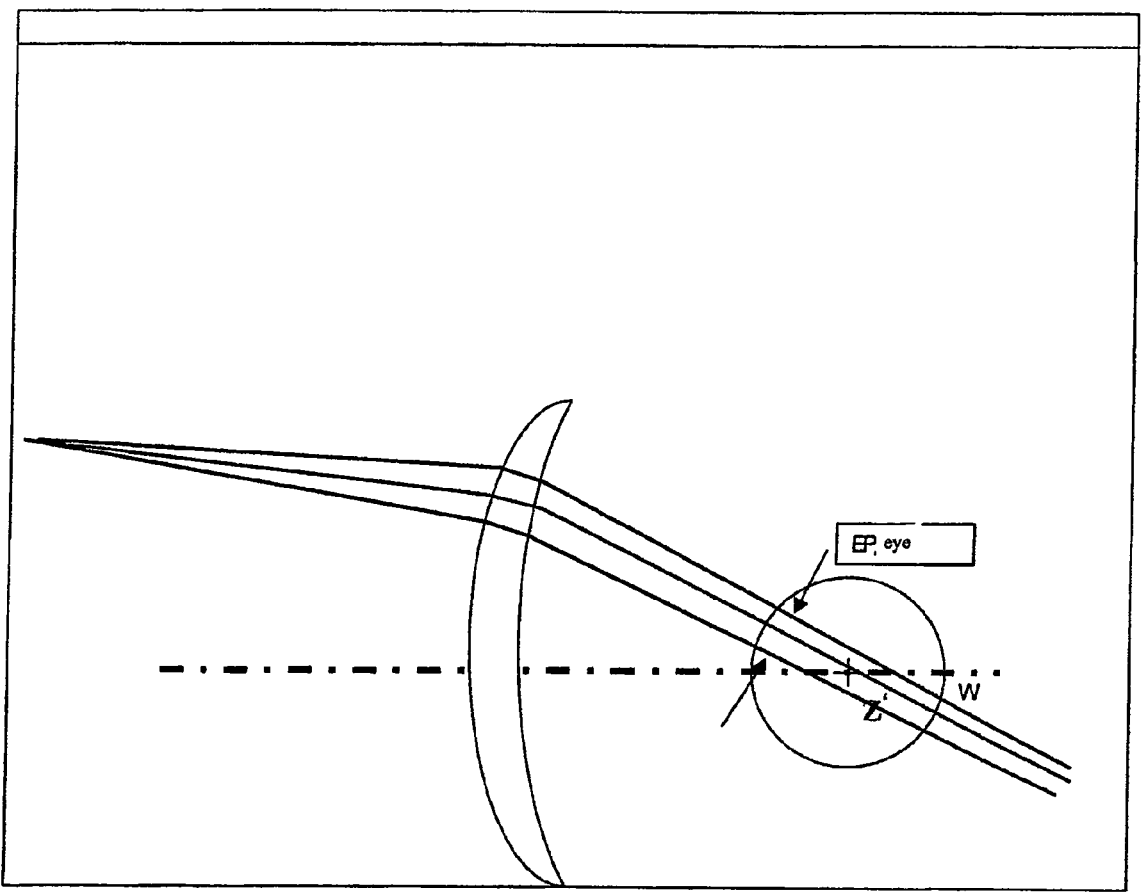

2003/0142266 A1 7/2003 Haimerl et al.
2004/0032565 A1* 2/2004 Yamakaji et al. ............. 351/177
2007/0132945 A1 6/2007 Haser et al.

FOREIGN PATENT DOCUMENTS

| DE | 10 2006 030 204 A1 | 1/2008 |
| JP | 2006-514336 T | 4/2006 |
| WO | WO 01/84213 A2 | 11/2001 |
| WO | WO 01/92948 A1 | 12/2001 |
| WO | WO 02/088830 A1 | 11/2002 |

OTHER PUBLICATIONS

Japanese Office Action dated May 7, 2013 with English translation (Nine (9) pages).

* cited by examiner

METHOD FOR OPTIMIZING A SPECTACLE LENS

The present invention relates to a method, a system and a computer program product for optimizing and in particular fabricating a spectacle lens.

In order to be able to calculate and optimize a spectacle lens online on receipt of order, it is desirable to use a very fast method for the optimization. In spectacle optics, ray tracing is a very time-consuming method. This applies particularly if the spectacle lens surfaces are not simple spherical surfaces but aspherical or progressive surfaces. In this case, ray tracing preferably represents a two-dimensional iteration method. To calculate and evaluate the imaging properties of a spectacle lens, the calculating time usually plays a subordinate role. However, if one wishes to optimize the spectacle lens in particular by means of a target function, the calculating time plays a decisive role. This holds true particularly for individual spectacle lenses in which the aspherical surface is to be optimized and calculated preferably online on receipt of order.

It is the object of the invention to simplify the design and fabrication of spectacle lenses, in particular of spectacle lenses individually optimized for a spectacle wearer, and particularly to enable a faster designing of spectacle lenses matched more precisely to a spectacle wearer's individual needs.

This object is solved by a method with the features according to claim 1, a computer program product with the features according to claim 19, and a system with the features according to claim 20. Preferred embodiments are subject of the dependent claims.

Thus, in one aspect, the invention provides a method for designing and fabricating a spectacle lens for a spectacle wearer, comprising:
a) obtaining individual user data or application data of the spectacle wearer;
b) specifying a draft design for the spectacle lens with a plurality of evaluation points;
c) determining a course of main rays through the plurality of evaluation points;
d) specifying a local wavefront for each of the main rays in an environment of the respective main ray;
e) determining optical properties of the spectacle lens at the evaluation points by determining an influence of the spectacle lens on the local wavefronts in an environment of the respective evaluation point; and
f) evaluating the draft design depending on the determined optical properties and the individual user data.

Even though the individual method steps are identified alphabetically for the sake of easier reference, the invention is not limited to one single method step order, in particular an order determined by the alphabetical identification.

A design of a spectacle lens preferably comprises the distribution of the target values for one or more aberrations, which are taken into account as target values in the optimization of the spectacle lens or in the determination of the target values. In particular, a spectacle lens is characterized by the distribution of the refractive error (i.e. the difference of the refractive power of the spectacle lens and the refractive power determined by means of refraction) and/or the distribution of the astigmatic error or astigmatic deviation (i.e. the difference of the astigmatism of the spectacle lens and the astigmatism determined by means of refraction). Furthermore, a spectacle lens design may also comprise the distribution of the target values for magnification errors, distortion errors or other aberrations. These values may be surface values or preferably powers of wear, i.e. powers in the position of wear of the spectacle lens.

Determining or obtaining or optimizing a spectacle lens design preferably comprises the determination of the spatial position (in particular the vertical and/or horizontal position(s)) and optionally the sizes of the viewing zones of the spectacle lens (i.e. the near, distance and intermediate or progression zones). The spatial positions of the viewing zones are particularly predetermined by the spatial positions of the distance and near reference points. The sizes of the viewing zones are calculated preferably automatically from the default values for the spatial positions of the distance and near reference points.

A main ray in particular designates a light ray starting from the object point through the ocular center of rotation and particularly through the middle of the pupil. Preferably, for designing the spectacle lens, a model system with the relevant optical reference points preferably depending on the obtained user data is created.

Thus, in one aspect, the invention relates to a method for fabricating a spectacle lens. In particular, the method comprises specifying a draft design of the spectacle lens by a surface representation in which a change of coefficients only has local effects. Moreover, a ray tracing method is used for the determination of a plurality of main rays through a plurality of evaluation points. A wavefront tracing method and/or a ray tracing method is/are used for calculating local wavefronts at the plurality of evaluation points. Furthermore, a determination of optic powers of the spectacle lens at the plurality of evaluation points from the local wavefronts takes place. Preferably, an optimization routine is used which takes the sparse Jacobian matrix into account. In particular, an optimization routine according to NG-Peyton is employed.

Preferably, the method comprises
modifying the draft design depending on the determined optical properties and the individual user data; and
repeating steps c) to f) on the basis of the modified draft design.

Particularly preferably, these steps keep being repeated until a target function has reached a desired value. Preferably, in the case of a positive or deemed-to-be-suitable evaluation of the draft design, same is specified as the design for the spectacle lens.

Preferably, the individual user data or application data of the spectacle wearer comprises optical correction data of a visual defect of the spectacle wearer and data of wear relating to an individual positioning of the spectacle lens for the spectacle wearer and/or relating to a visual task of the spectacle wearer. Preferably, the individual data of wear comprises frame data, in particular relating to a box dimension of the face forms and/or a bridge width and/or a face form angle and/or a forward inclination, etc. In a preferred embodiment, the individual data of wear comprises default data on primarily used viewing angle zones and/or primarily used object distances. Preferably, the individual user data comprises a corneal vertex distance and/or a forward inclination and/or a centration position and/or a pupillary distance, etc.

The optical correction data preferably comprises values for a to-be-corrected dioptric power (sphere) and/or cylinder and/or axis position and/or addition and/or prism and/or base, etc., and individual data on the position of wear.

Preferably, specifying a draft design for the spectacle lens comprises specifying a coordinate system and illustweighting at least one starting surface of the spectacle lens in the coordinate system at least partly by coefficients on which the at least one starting surface only depends locally, i.e. in a limited surface area comprising at least one evaluation point. These limited surface areas preferably only comprise a relatively small portion of an entire spectacle lens surface.

Preferably, specifying a draft design comprises illust-weighting at least one starting surface of the spectacle lens by B-spline functions.

Preferably, the plurality of evaluation points comprises at least 1000, preferably at least 2000, more preferably at least 5000, particularly preferably at least 10000, most preferably at least 20000 evaluation points.

Preferably, determining a course of main rays comprises specifying an individual model system taking into account the obtained user data. The individual model system preferably comprises a spectacle lens model according to the draft design, an eye model and/or an object model according to the user data.

Preferably, each main ray is assigned an object distance depending on the obtained user data, particularly a visual task or application situation comprised by the obtained user data, wherein the local wavefront is specified depending on the object distance assigned to the respective main ray.

Preferably, determining optical properties of the spectacle lens at the evaluation points comprises determining a spherical power and/or an astigmatism and/or a coma and/or a spherical aberration and/or a trefoil.

Preferably, determining the course of the plurality of main rays comprises determining penetration points and penetration angles of the main rays through the spectacle lens surfaces, wherein determining the influence of the spectacle lens on the local wavefronts comprises:
  determining the oblique thickness of the lens along the respective main rays in the spectacle lens;
  determining the curvatures of the object-side, i.e. incoming or incident, wavefronts and/or curvatures or main curvatures and directions of the emerging wavefronts; and
  determining the main curvatures and directions of the spectacle lens surfaces at the penetration points.

Preferably, evaluating the draft design comprises evaluating and interpreting a target function depending on the determined optical properties, and the draft design is modified preferably with a minimization of the target function in mind.

Preferably, the determined optical properties comprise an astigmatism $A_{lens}(i)$ of the spectacle lens at the evaluation point i, which deviates from the astigmatic power required by the user data for a fullcorrection by a residual astigmatism $A_{actual}(i)$, and a spherical power $D_{lens}(i)$ of the spectacle lens at the evaluation point i, which deviates from the spherical power required by the user data for a fullcorrection by a residual power $D_{actual}(i)$, wherein for each evaluation point, a value $A_{target}(i)$ of a faulty correction of the astigmatism and a value $D_{target}(i)$ of a faulty correction of the dioptric power are specified, and wherein the draft design of the spectacle lens is modified with a minimization of the target function $$F = \sum_i (A_{actual}(i) - A_{target}(i))^2 + (D_{actual}(i) - D_{target}(i))^2$$

in mind.

Preferably, for each evaluation point, the residual astigmatism is calculated by means of the cross-cylinder method from the astigmatism of the spectacle lens and an astigmatism of a spectacle wearer's eye comprised by the individual user data.

In one aspect, the invention provides a method for designing and fabricating a spectacle lens for a spectacle wearer, comprising:
  determining at least one higher-order aberration for at least one eye of the spectacle wearer; and
  designing a spectacle lens taking into account the determined higher-order aberration.

As defined by the invention, a higher-order aberration is each aberration not only comprising prismatic, spherical and astigmatic components. Higher-order aberrations particularly comprise coma and/or spherical aberration. In a preferred embodiment, higher-order aberrations particularly comprise "Seidel aberrations", such as spherical aberration, coma, astigmatism, field curvature, trefoil and/or distortion.

Preferably, the step a) of obtaining individual user data comprises determining the at least one higher-order aberration, wherein designing the spectacle lens taking into account the higher-order aberration comprises steps b) to f). Preferably, determining higher-order aberrations comprises determining an aberration function, in particular an aberration function $W_A(r)$ depending only on the radial distance r from the pupil center, for the at least one eye of the spectacle wearer.

Preferably, determining higher-order aberrations comprises specifying a Cartesian x, y, z coordinate system and determining an aberration function $W(x, y)$ for the at least one eye of the spectacle wearer in particular in coordinates of this coordinate system. Preferably, the aberration function $W(r)$ for the at least one eye is expanded in terms of powers of the distance r from the pupil center $$W_A(r) = \sum_i \frac{S_i}{i!} r^i = S_1 * r + \frac{S_2}{2} * r^2 + \frac{S_3}{6} * r^3 + \frac{S_4}{24} * r^4 \ldots$$

Preferably, designing a spectacle lens comprises specifying an aberration function of the spectacle lens on the basis of and depending on the aberration function of the eye.

Preferably, specifying the aberration function $W_G(R)$ of the spectacle lens as a function of a distance R from a centration point of the spectacle lens comprises scaling the aberration function $W_A(R)$ of the eye by substituting a distance $$R \cdot \frac{R_P}{R_t}, \text{ i.e. } W_G(R) = W_A\left(R \cdot \frac{R_P}{R_t}\right)$$

for the distance r, with a pupil radius $R_P$ for the at least one eye of the spectacle wearer and a transformation radius $R_t$ that is greater than the pupil radius $R_P$ and not larger than the radius $R_{G,max}$ of the largest circle around the centration point of the spectacle lens, which comprises at least one point of the spectacle lens in particular within the spectacle frame. Preferably, the transformation radius $R_t$ is not larger than the radius $R_{G,min}$ of the largest circle around the centration point which lies fully within the face form.

Preferably, the determined optical properties comprise an astigmatism $A_{lens}(i)$ of the spectacle lens at the evaluation point i, which deviates from the astigmatic power required by the user data for a fullcorrection by a residual astigmatism $A_{actual}(i)$, a dioptric power $D_{lens}(i)$ of the spectacle lens at the evaluation point i, which deviates from the dioptric power required by the user data for a fullcorrection by a residual power $D_{actual}(i)$, and at least one value $Z_{lens}(i)$ of a higher-order optical power, in particular a quantity of a higher-order aberration of the spectacle lens at the evaluation point i, which deviates from the correction power required by the user data for a fullcorrection by a residual aberration $Z_{actual}(i)$, wherein for each evaluation point, a value $A_{target}(i)$ of a faulty correction of the astigmatism, a value $D_{target}(i)$ of a faulty correction of the dioptric power, and a value $Z_{target}(i)$ of a faulty correction for the at least one higher-order aberration are specified, and wherein the draft of the spectacle lens is modified with a minimization of a target function $$F = \sum_i g_A(i) \cdot (A_{actual}(i) - A_{target}(i))^2 + g_D(i) \cdot (D_{actual}(i) - D_{target}(i))^2 + g_Z(i) \cdot (Z_{actual}(i) - Z_{target}(i))^2$$

in mind, wherein weighting functions g are provided.

In a further example, a target function could be used as follows:

$$F = \sum_i (A_{actual}(i) - A_{target}(i))^2 + (D_{actual}(i) - D_{target}(i))^2 + R(i)$$

wherein the target function depends on a residual function $R(i)$ in which higher-order aberrations are taken into account. A further preferred target function could read:

$$F = \sum_i g_A(i) \cdot (A_{actual}(i) - A_{target}(i))^2 + g_D(i) \cdot (D_{actual}(i) - D_{target}(i))^2 + R_Z(i)$$

By analogy with the above, there is used:

$$R_Z(i) = \sum_k g_k(i) \cdot (Z_{k,actual}(i) - Z_{k,target}(i))^2$$

Preferably, the local wavefronts are developed and represented with Zernike polynomials and/or a Taylor series.

Preferably, the method comprises specifying a pupillary sensory function for describing a decreasing sensory weighting toward the pupil edge, in particular for describing the Stiles-Crawford effect, and specifying a set of orthogonal functions for representation of the local wavefronts taking the pupillary sensory function into account.

In a preferred embodiment, the variable $Z_{lens}(i)$ for a single aberration is at the evaluation point i according to Zernike. In another preferred embodiment, it comprises a weighted sum of aberration at the evaluation point i according to Zernike, or for a quantity of aberration based on the wavefront aberration $W(x, y)$ of the pupil as a function of the pupil coordinates x, y and particularly given by one of the following possibilities:

a) $RMS_w$ (root mean square)

$$RMS_W = \sqrt{\frac{1}{A} \int_{pupil} (W(x, y) - \overline{W})^2 dx dy},$$

where A is the pupil area and $\overline{W}$ is the mean value b) maximum travel of wavefront aberration, $PV = \max(W(x, y)) - \min(W(x, y))$ c) $RMS_s$ (root mean square wavefront slope)

$$RMS_S = \sqrt{\frac{1}{A} \int_{pupil} (W_x(x, y) - \overline{W}_x)^2 + (W_y(x, y) - \overline{W}_y)^2 dx dy},$$

where A is the pupil area and $W_x = \partial W/\partial x$, $W_y = \partial W/\partial y$ are the partial derivatives of the wavefront d) R(D50), diameter of the region around the point spread function (PSF), in which half of the intensity arrives:

$$0.5 = \int_0^{2\pi} \int_0^{r(D50)} psf(r, \vartheta) r \, dr \, d\vartheta,$$

where $psf(r, \theta)$ is the PSF in polar coordinates $r, \theta$ of the image plane e) width EW of the PSF $$EW = \sqrt{4(\int_{-\infty}^{\infty} \int_{-\infty}^{\infty} psf(x, y) dx dy)/(\pi \cdot psf(x_0, y_0))},$$

where $x_0, y_0$ are the coordinates of the maximum of the PSF f) root SM of the second moment of light distribution $$SM = \sqrt{(\int_{-\infty}^{\infty} \int_{-\infty}^{\infty} (x^2 + y^2) psf(x, y) dx dy)/(\int_{-\infty}^{\infty} \int_{-\infty}^{\infty} psf(x, y) dx dy)}$$

g) half-width at half-height, HWHH, $$HWHH = \sqrt{\frac{1}{\pi} (\int_{-\infty}^{\infty} \int_{-\infty}^{\infty} q_H(x, y) dx dy)},$$

where $q_H(x,y) = 1$ for $psf(x,y) > \max(psf)/2$ and $q_H(x,y) = 0$ otherwise h) correlation width CW of light distribution $$CW = \sqrt{\frac{1}{\pi} (\int_{-\infty}^{\infty} \int_{-\infty}^{\infty} q_A(x, y) dx dy)},$$

where $q_A(x,y) = 1$ for $PSF \cdot PSF > \max(PSF \cdot PSF)/2$ and $q_A(x, y) = 0$ otherwise, and $PSF \cdot PSF > \max(PSF \cdot PSF)/2$ the autocorrelation of the PSF i) Strehl ratio SRX, $$SRX = \frac{\max(psf)}{\max(psf_{DL})},$$

where $psf_{DL}$ is the diffraction-limited PSF j) fraction LIB of the energy falling in the region of the diffraction core, $$LIB = \int_{DLcore} psf_N(x, y) dx dy,$$

where $psf_N$ is the PSF normalized to 1 k) standard deviation STD of light distribution in relation to that of the diffraction-limited light distribution, $$STD = \sqrt{\int_{PSF}(psf(x,y) - \overline{psf})^2 dxdy} \Big/ \sqrt{\int_{PSF}(psf_{DL}(x,y) - \overline{psf}_{DL})^2 dxdy},$$

where PSF is a region about the center of the PSF, which obtains the essential proportion of the intensity l) entropy ENT of PSF, $$ENT = -\int_{-\infty}^{\infty}\int_{-\infty}^{\infty} psf(x,y)\ln psf(x,y)dxdy$$

m) sharpness NS of the visual system, $$NS = \left(\int_{-\infty}^{\infty}\int_{-\infty}^{\infty} psf(x,y)g_N(x,y)dxdy\right) \Big/ \left(\int_{-\infty}^{\infty}\int_{-\infty}^{\infty} psf_{DL}(x,y)g_N(x,y)dxdy\right),$$

where $g_N$ is a weighting function of the visual system n) visual Strehl ratio VSX, $$NS = \left(\int_{-\infty}^{\infty}\int_{-\infty}^{\infty} psf(x,y)N_{csf}(x,y)dxdy\right) \Big/ \left(\int_{-\infty}^{\infty}\int_{-\infty}^{\infty} psf_{DL}(x,y)N_{csf}(x,y)dxdy\right),$$

where $N_{csf}$ is a weighting function of the visual system, which is equal to the Fourier transform of the contrast-sensitivity function of the visual system o) cut-off frequency of the radial modulation transfer function, SFcMTF=highest (spatial) frequency for which rMTF> threshold of the visual system, where $$rMTF(f) = \int_0^{2\pi} \text{abs}(OTF(f,\varphi))d\varphi$$

and OTF is the optical transfer function p) cut-off frequency of the radial optical transfer function, SFcOTF=highest (spatial) frequency for which rOTF> threshold of the visual system, where $$rOTF(f) = \int_0^{2\pi} OTF(f,\varphi)d\varphi$$

and OTF is the optical transfer function q) area of visibility of rMTF, $$AreaMTF = \left(\int_0^{cutoff} rMTF(f)df - \int_0^{cutoff} T_N(f)df\right) \Big/$$

$$\left(\int_0^{cutoff} rMTF_{DL}(f)df - \int_0^{cutoff} T_N(f)df\right),$$

where $T_N(f)$ is the contrast threshold function of the visual system, which is equal to the inverse of the contrast-sensitivity function of the visual system r) area of visibility of rOTF, $$AreaOTF = \left(\int_0^{cutoff} rOTF(f)df - \int_0^{cutoff} T_N(f)df\right) \Big/$$

$$\left(\int_0^{cutoff} rOTF_{DL}(f)df - \int_0^{cutoff} T_N(f)df\right)$$

s) Strehl ratio calculated in the frequency domain, MTF method, $$SRMTF = \left(\int_{-\infty}^{\infty}\int_{-\infty}^{\infty} MTF(f_x,f_y)df_x df_y\right) \Big/ \left(\int_{-\infty}^{\infty}\int_{-\infty}^{\infty} MTF_{DL}(f_x,f_y)df_x df_y\right)$$

t) Strehl ratio calculated in the frequency domain, OTF method, $$SROTF = \left(\int_{-\infty}^{\infty}\int_{-\infty}^{\infty} OTF(f_x,f_y)df_x df_y\right) \Big/ \left(\int_{-\infty}^{\infty}\int_{-\infty}^{\infty} OTF_{DL}(f_x,f_y)df_x df_y\right)$$

u) visual Strehl ratio calculated in the frequency domain, MTF method, $$SRMTF = \left(\int_{-\infty}^{\infty}\int_{-\infty}^{\infty} CSF_N(f_x,f_y)MTF(f_x,f_y)df_x df_y\right) \Big/$$

$$\left(\int_{-\infty}^{\infty}\int_{-\infty}^{\infty} CSF_N(f_x,f_y)MTF_{DL}(f_x,f_y)df_x df_y\right)$$

where $CSF_N(f_x,f_y)$ is the contrast-sensitivity function of the visual system v) Strehl ratio calculated in the frequency domain, OTF method, $$SROTF = \left(\int_{-\infty}^{\infty}\int_{-\infty}^{\infty} CSF_N(f_x,f_y)OTF(f_x,f_y)df_x df_y\right) \Big/$$

$$\left(\int_{-\infty}^{\infty}\int_{-\infty}^{\infty} CSF_N(f_x,f_y)OTF_{DL}(f_x,f_y)df_x df_y\right)$$

w) volume under the OTF, normalized to the volume under the MTF, $$VOTF = \left(\int_{-\infty}^{\infty}\int_{-\infty}^{\infty} OTF(f_x,f_y)df_x df_y\right) \Big/ \left(\int_{-\infty}^{\infty}\int_{-\infty}^{\infty} MTF(f_x,f_y)df_x df_y\right)$$

x) weighted volume under the OTF, normalized to the volume under the MTF, $$VNOTF = \left( \int_{-\infty}^{\infty} \int_{-\infty}^{\infty} CSF_N(f_x, f_y) OTF(f_x, f_y) df_x df_y \right) \Big/$$
$$\left( \int_{-\infty}^{\infty} \int_{-\infty}^{\infty} CSF_N(f_x, f_y) MTF(f_x, f_y) df_x df_y \right)$$

In one aspect, the invention relates to a method for producing a spectacle lens, comprising a method for designing a spectacle lens for a spectacle wearer according to the present invention or a preferred embodiment thereof, and fabricating the spectacle lens according to the determined design.

In one aspect, the invention provides a computer program product comprising a program code which, when loaded and executed in a computer system, is adapted to perform a method according to the present invention or a preferred embodiment thereof.

In one aspect, the invention provides a system for designing a spectacle lens, the system being adapted to perform method steps according to the present invention or a preferred embodiment thereof.

Figure 2:
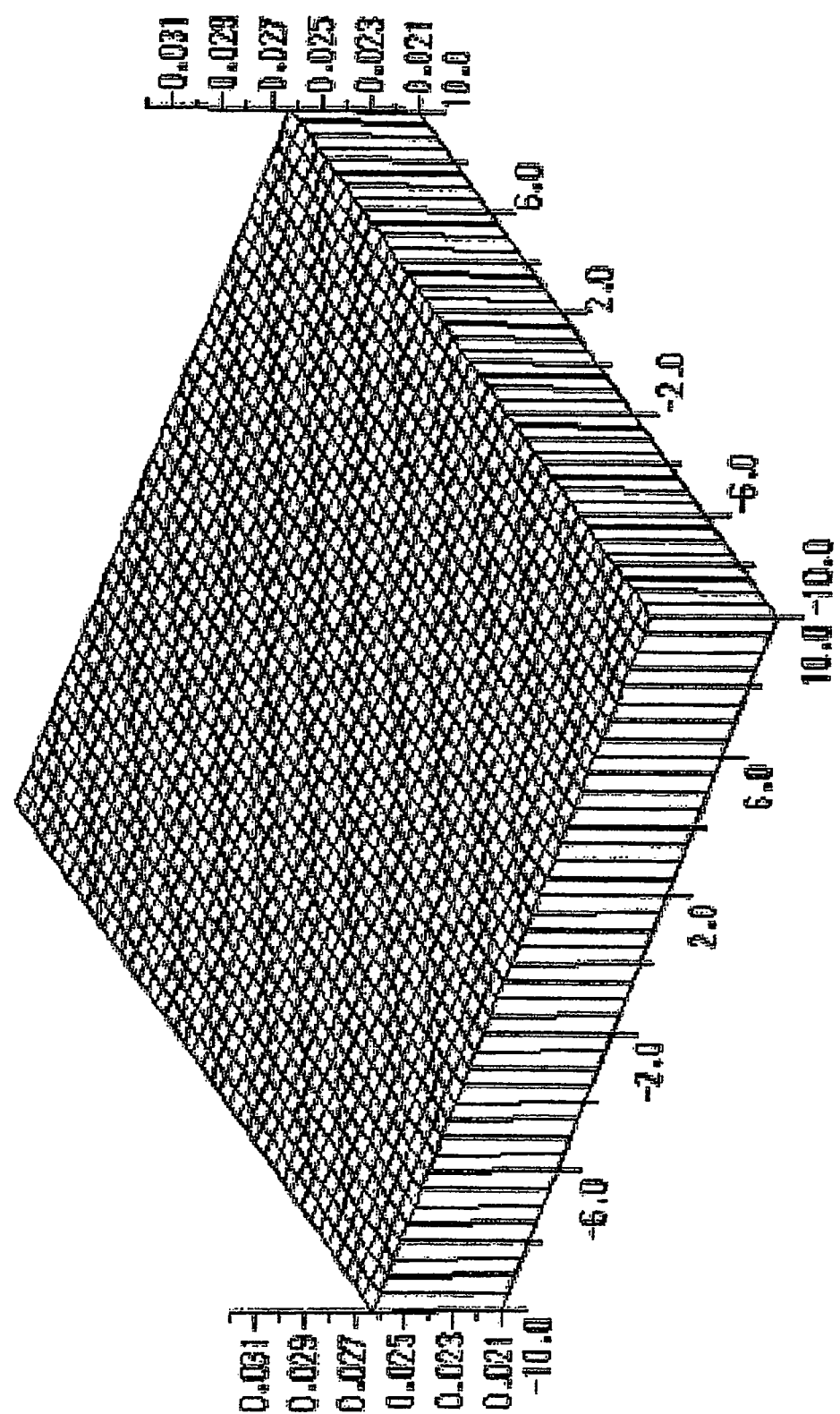
Figure 3:
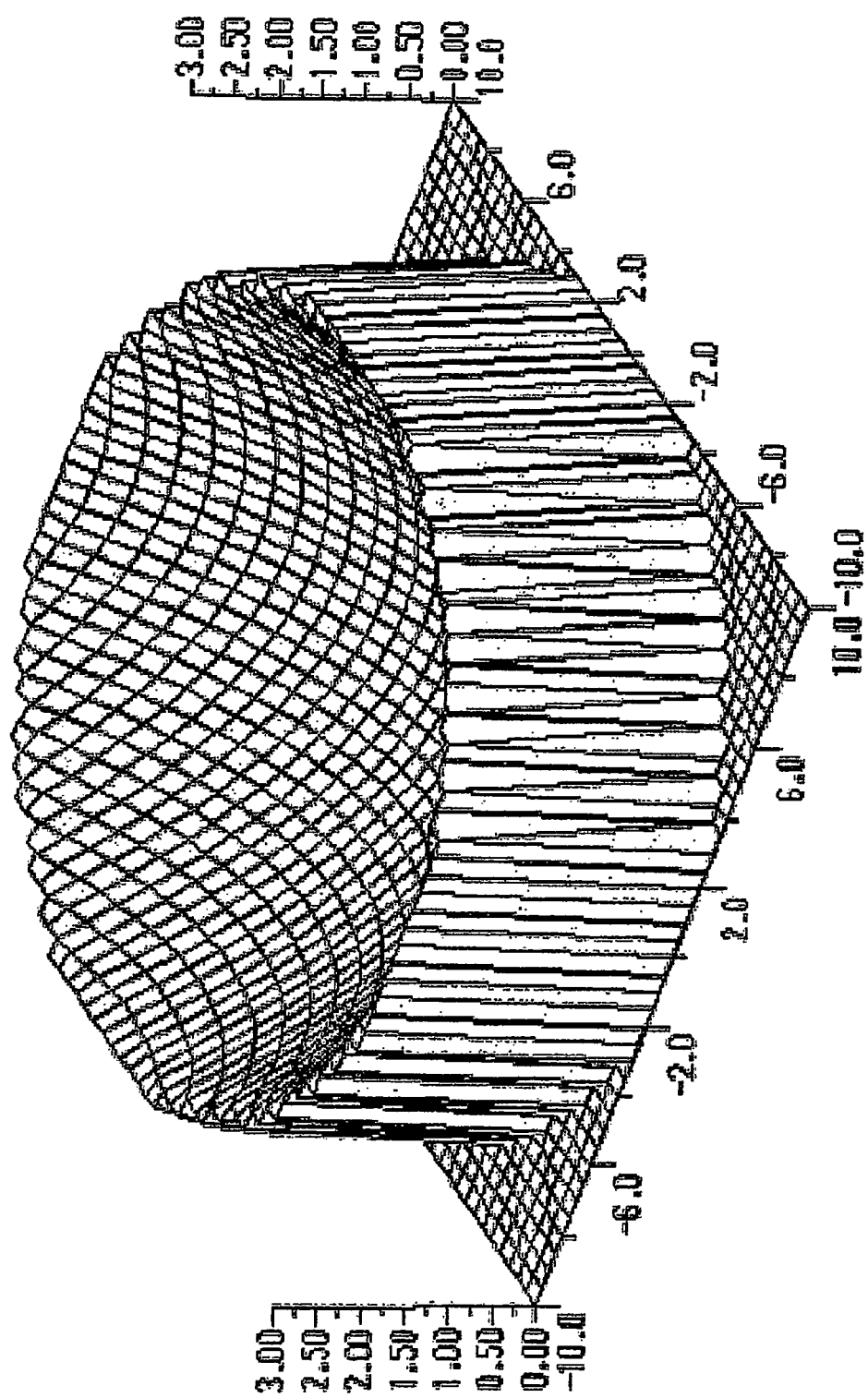
Figure 4:
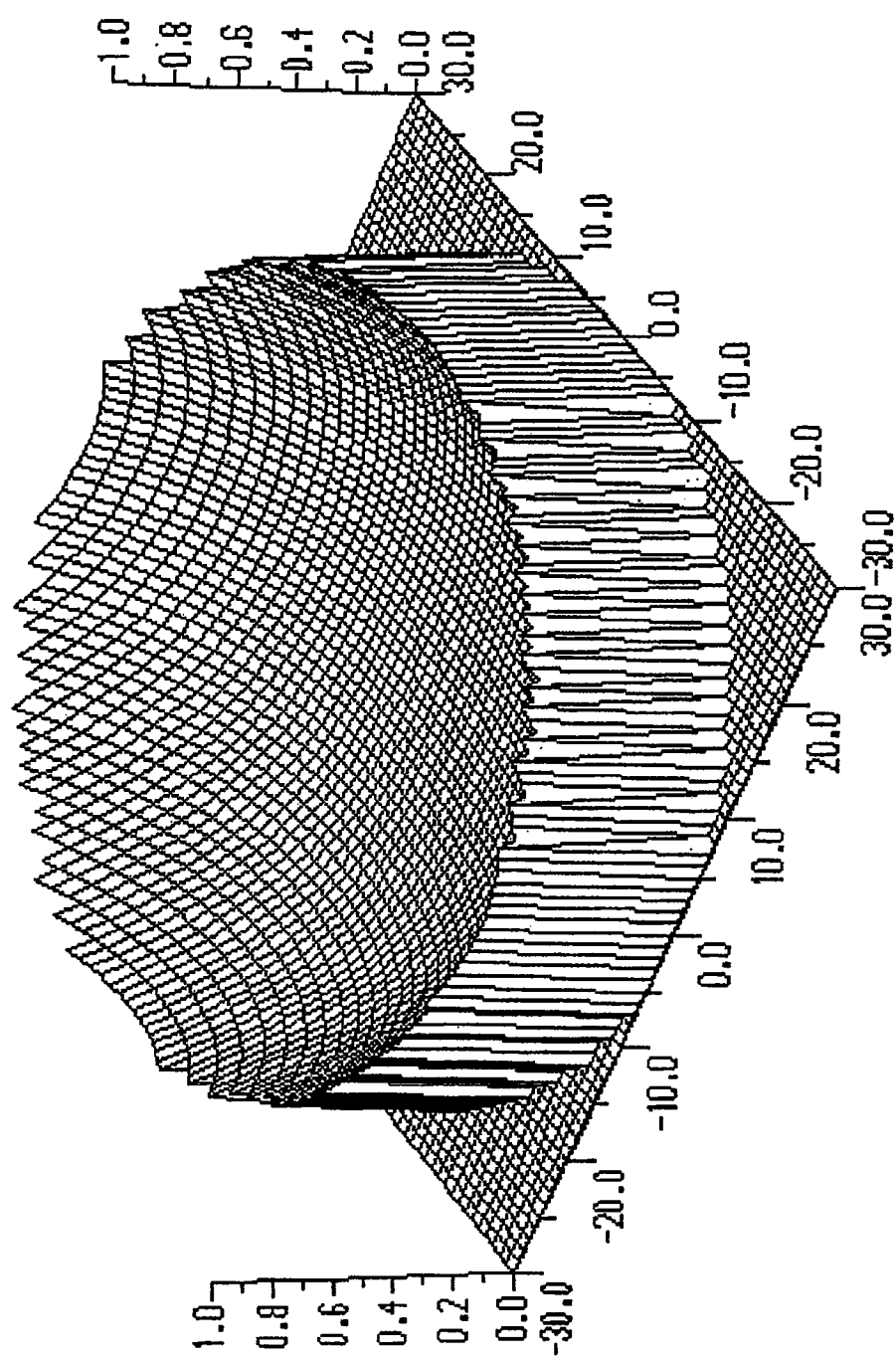
Figure 5:
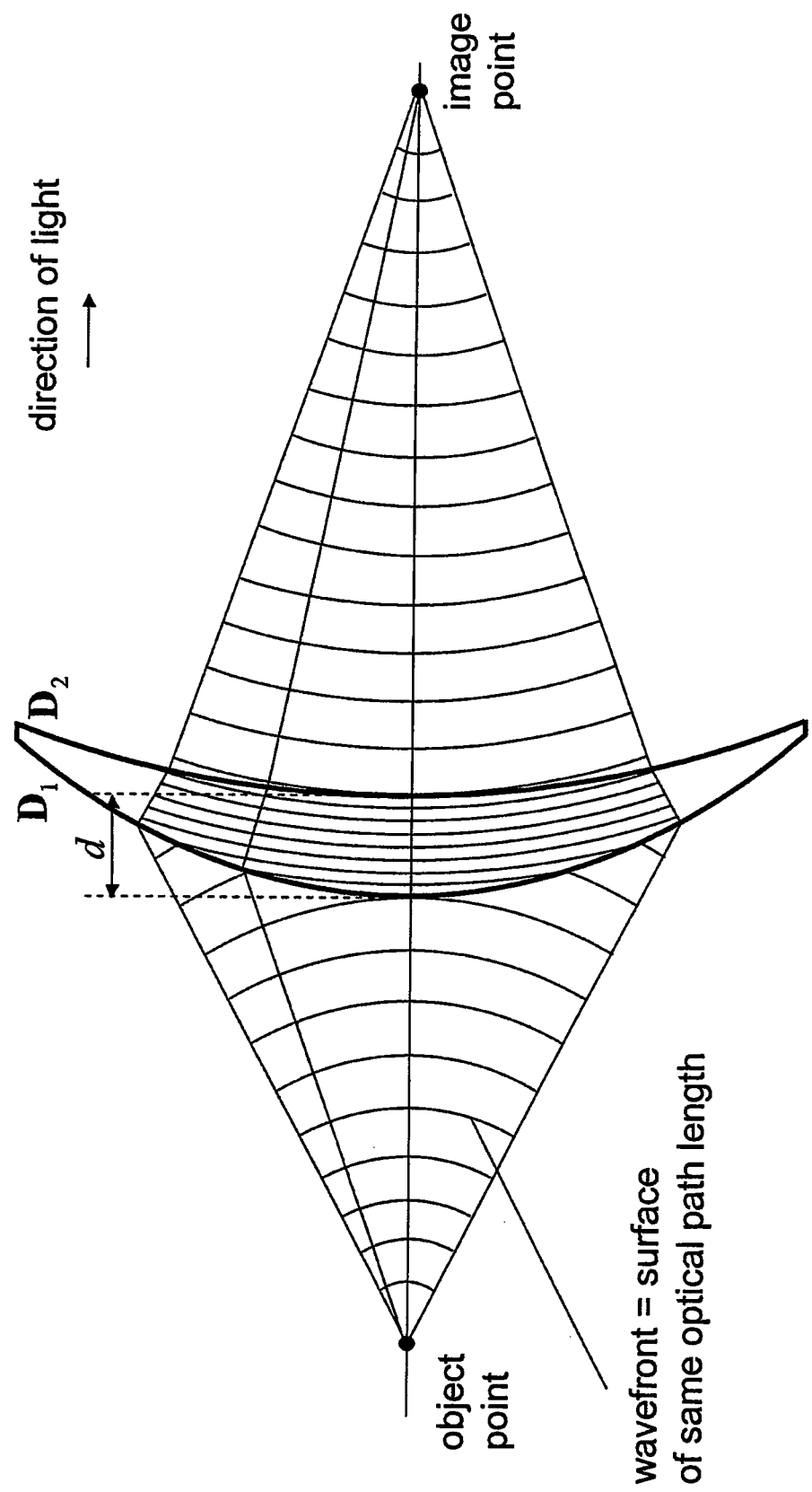
Figure 6:
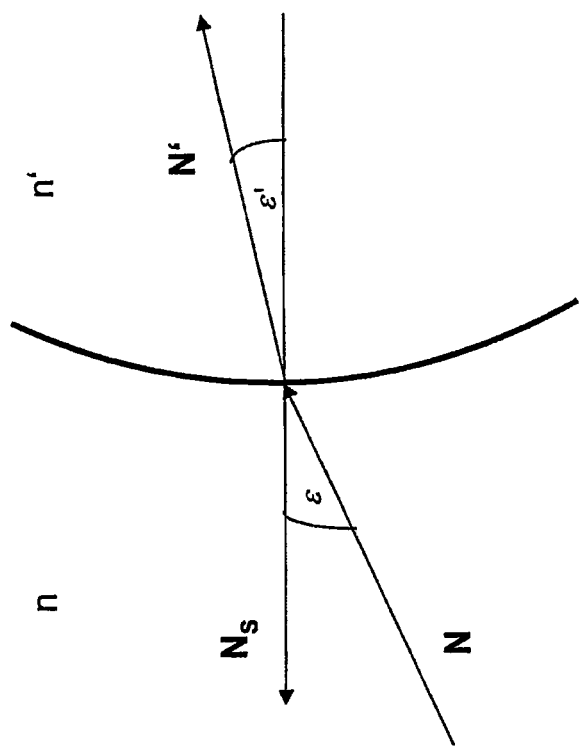
Figure 7:
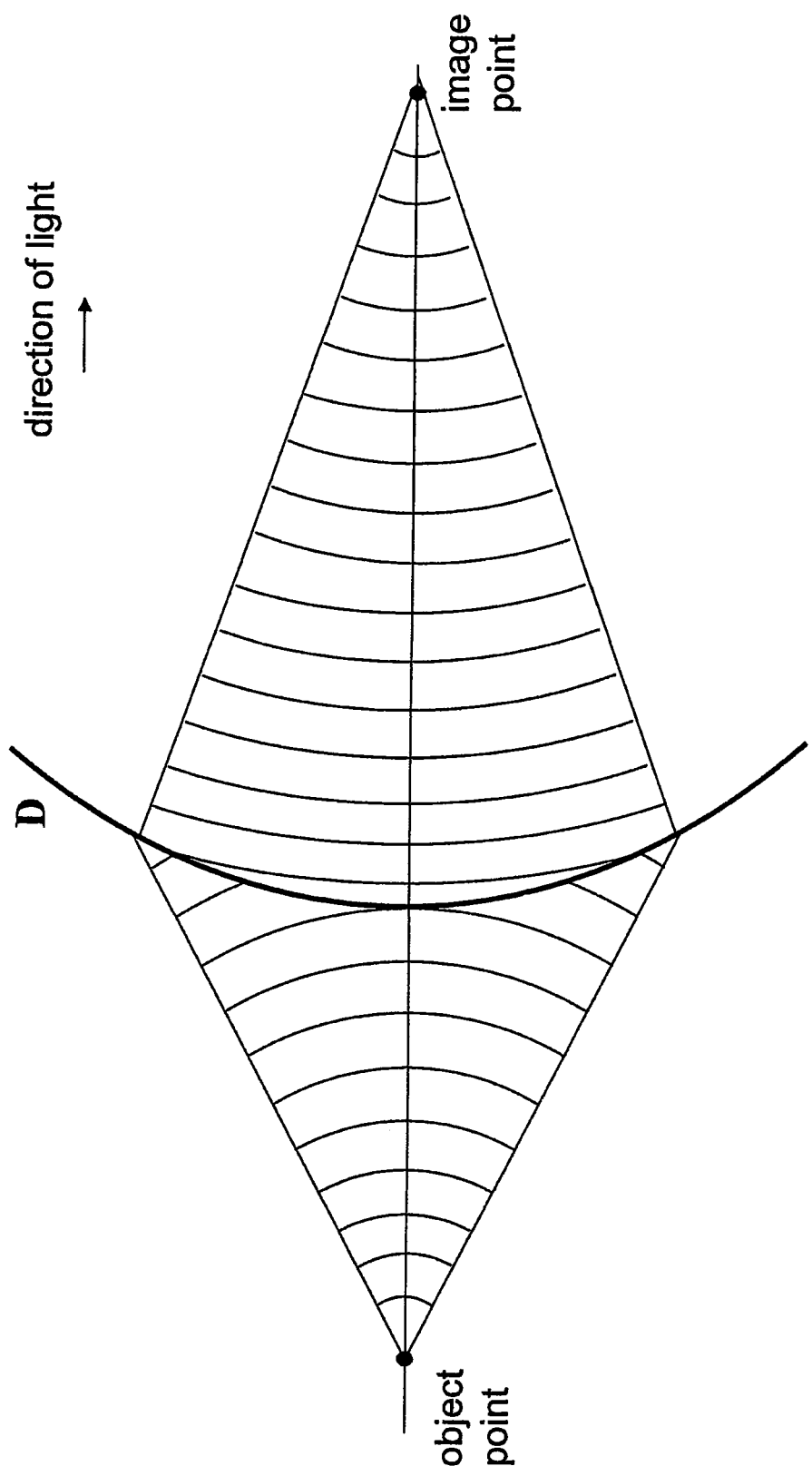
Figure 8:
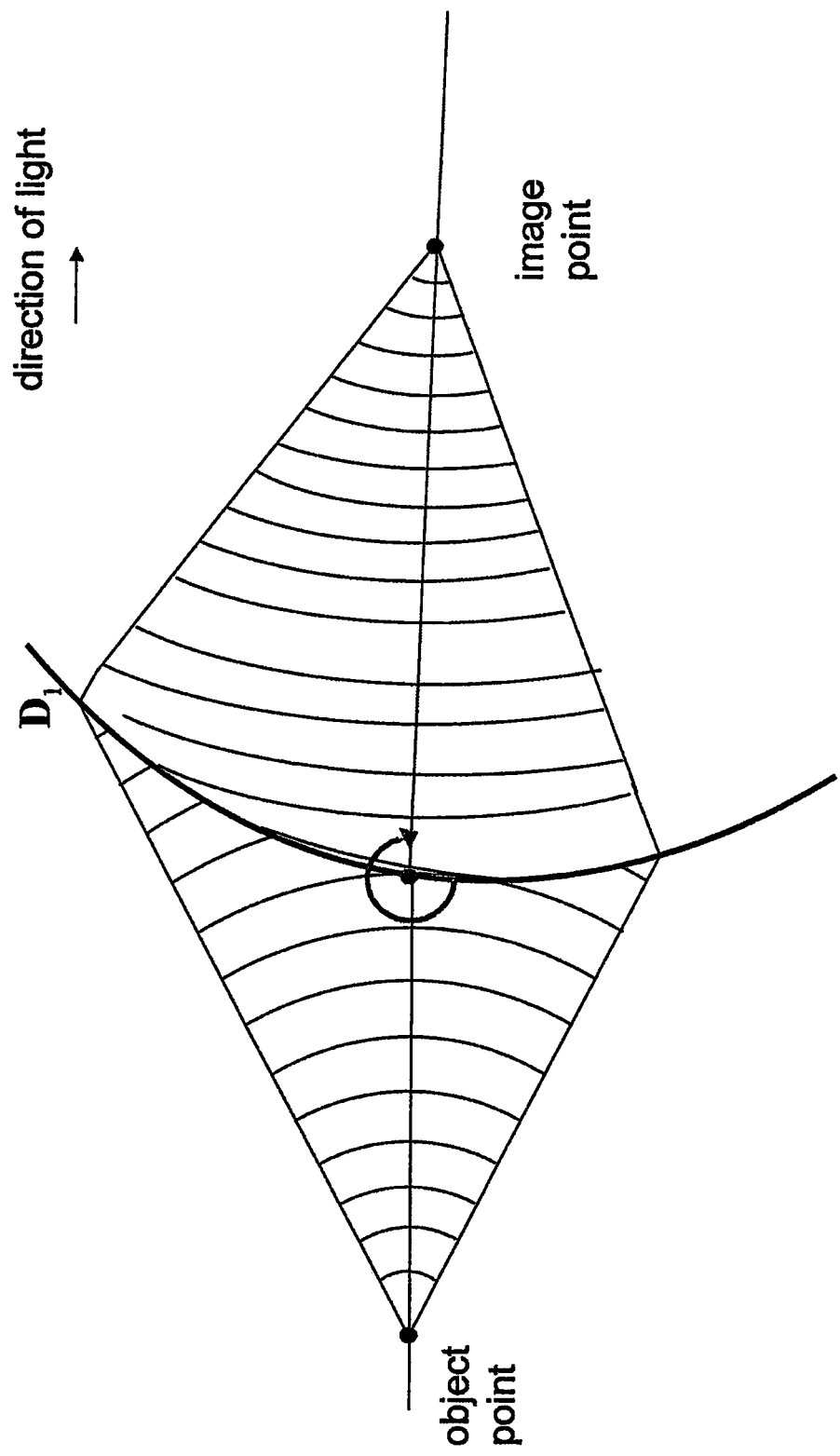
Figure 9:
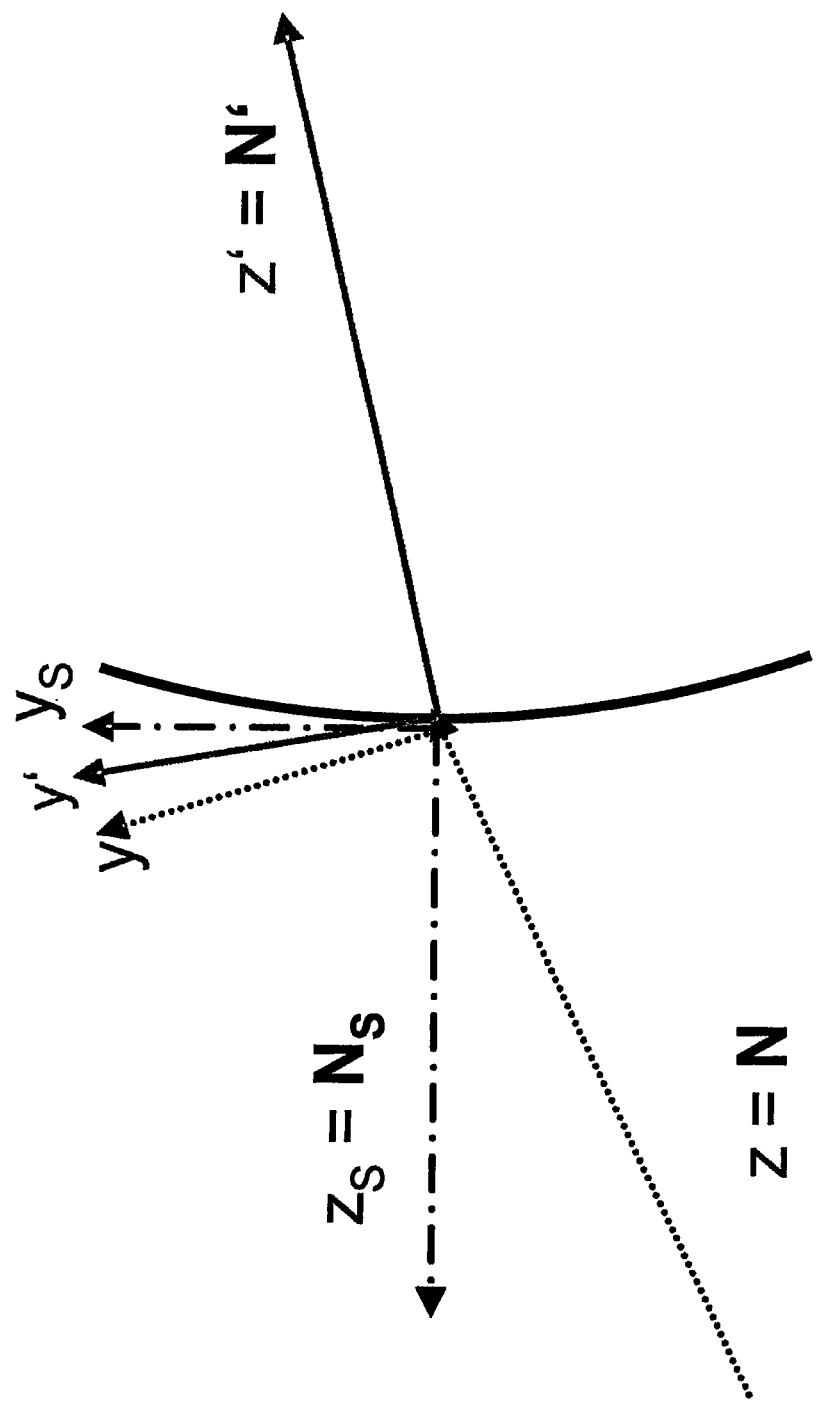
Figure 10:
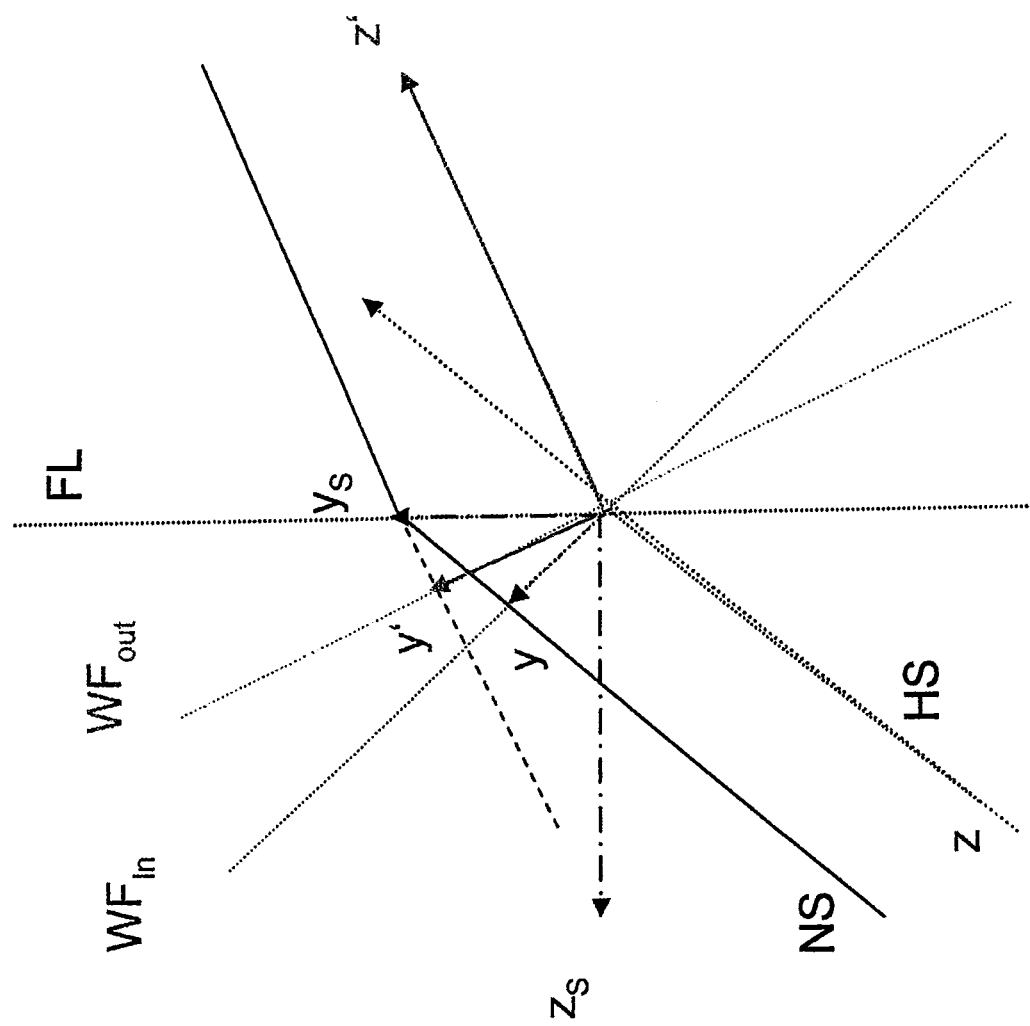
Figure 11:
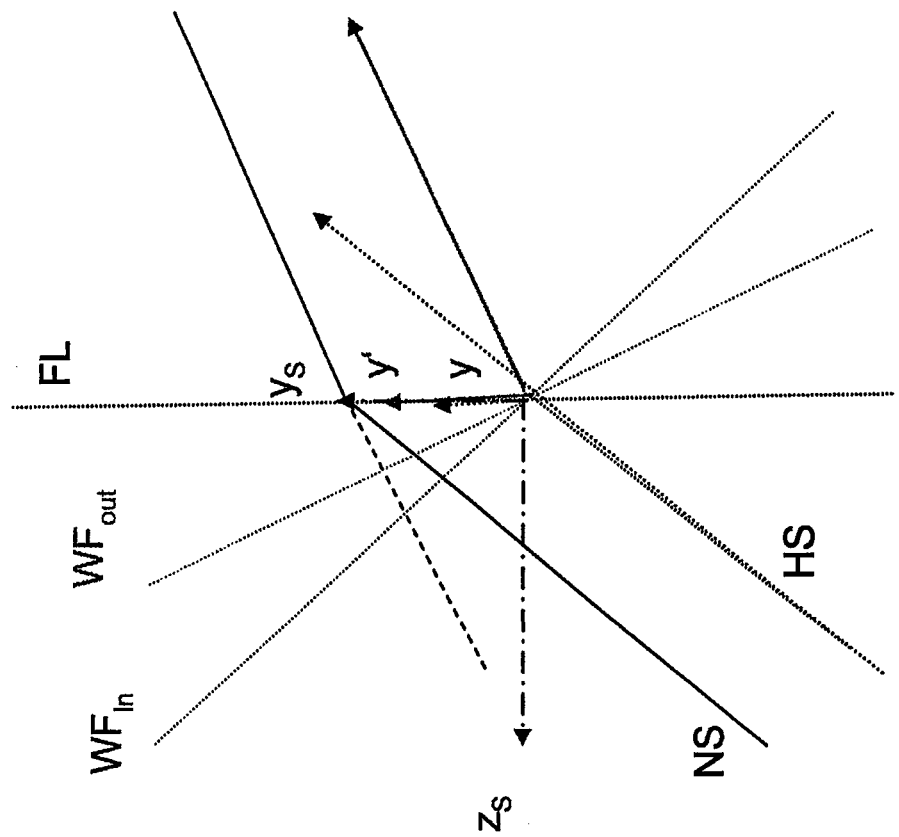
Figure 12:
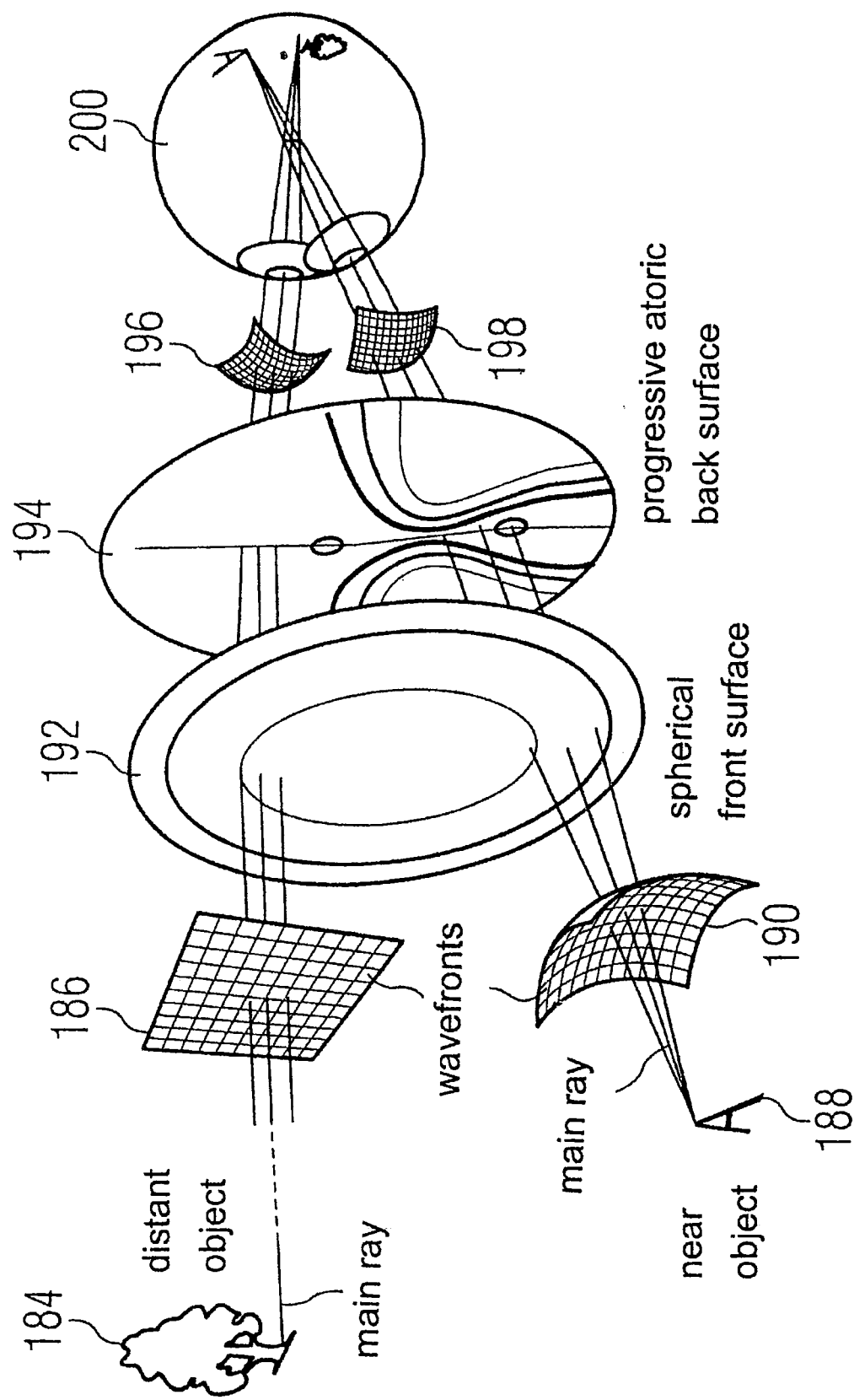

In the following, the invention will be exemplarily described with reference to accompanying drawings of preferred embodiments, which show:

FIG. 1: an exemplary ray path of an exemplary eye and a spectacle lens for representation of the rotation of the entrance pupil of the eye upon sight deviation or eye excursion;

FIG. 2: a spectacle lens having a relatively low spherical aberration of 0.025 micrometers in all visual points;

FIG. 3: the spherical aberration of the spectacle lens of FIG. 2 for $|x|, |y| \leq 10$ mm in units of D;

FIG. 4: the astigmatism of a preferred spectacle lens in which the spherical aberration has been corrected from $c=0.5$ micrometers for a spectacle lens diameter of 40 mm ($r_{spectacle\ lens}=20$ mm);

FIG. 5: a schematic representation of a mapping of an object point in an image point on a lens with two surfaces with the refractive powers D1, D2 and the center thickness d;

FIG. 6: Snell's law;

FIG. 7: refraction of a spherical wavefront on a spherical surface;

FIG. 8: transition to the oblique incidence and the leaving of the rotational symmetry. A spherical wavefront is incident obliquely on a spherical surface or an astigmatic surface in which a principal direction of curvature coincides with the refraction plane;

FIG. 9: local coordinate systems of the surface, the incident and emerging wavefronts;

FIG. 10: connection between the coordinates y of the incident wavefront, $y_s$ of the refracting surface, and y' of the emerging wavefront, using three local coordinate systems;

FIG. 11: connection between the coordinates y of the incident wavefront, $y_s$ of the refracting surface, and y' of the emerging wavefront, using a global coordinate system;

FIG. 12: a schematic representation of the physiological and physical model of a spectacle lens in a predetermined position of wear.

In a method according to a preferred embodiment of the present invention, only the central main ray is calculated by means of a ray tracing method and subsequently the imaging properties are calculated from the properties of local wavefronts by means of a wavefront tracing method. In particular, according to a preferred embodiment, the imaging properties (refractive power and astigmatism) are calculated for at least one direction of sight, particularly for each direction of sight, preferably directly from the data of the central main ray for the respective direction of sight with the angles of incidence and reflection thereof, the oblique thickness, the curvatures and main curvatures and directions of the incoming wavefront and the main curvatures and directions of the spectacle lens surfaces at the penetration point.

Particularly preferably, a ray iteration is performed only once for each direction of sight. More specifically, the computing effort involved with the ray iteration can be reduced considerably. Preferably, the spectacle lens is optimized by means of a target function. An exemplary, preferred target function is $$\min F = \sum_i (A_{actual}(i) - A_{target}(i))^2 + (D_{actual}(i) - D_{target}(i))^2 \quad (1)$$

where $A_{actual}(i)$=actual astigmatism at the $i^{th}$ evaluation point;

$A_{target}(i)$=required astigmatism at the $i^{th}$ evaluation point;

$D_{actual}(i)$=actual refractive power at the $i^{th}$ evaluation point, and $D_{target}(i)$=required refractive power at the $i^{th}$ evaluation point.

A special advantage of the importance of the target variables is that they apply irrespective of the prescription. They indicate in particular by which value the respective variable is to deviate from the value zero of the fullcorrection. In particular, the actual astigmatism is the residual astigmatism of the combination of spectacle lens and eye, which is preferably calculated by means of the cross-cylinder method. Correspondingly, the actual refractive error particularly is the sphere of the thus calculated combination of lens and eye.

Preferably, the refractive power and the astigmatism are calculated as follows:

Preferably, both variables are determined from the combination of the refraction matrix $S_R$ and the vergence matrix $S_{SK}$, which describes the incident wavefront in the position of wear after passing through the lens at the vertex sphere. For a preferred calculation of $S_{SK}$, exemplary reference is made to equation (7). The refraction matrix is preferably determined by $$S_R = \begin{pmatrix} Sph_R - \dfrac{Cyl_R}{2}\cos 2\Psi_R & -\dfrac{Cyl_R}{2}\sin 2\Psi_R \\ -\dfrac{Cyl_R}{2}\sin 2\Psi_R & Sph_R + \dfrac{Cyl_R}{2}\cos 2\Psi_R \end{pmatrix}, \quad (2)$$

where $Sph_R$ is the spherical equivalent of the refraction determination, $Cyl_R$ is the refracted cylinder and $\Psi_R$ the axis position thereof. The combination of $S_R$ and $S_{SK}$ is preferably determined by the difference matrix $$S_\Delta = S_{SK} - S_R \quad (3)$$

In the case of a fullcorrection, there applies $$S_\Delta = \begin{pmatrix} 0 & 0 \\ 0 & 0 \end{pmatrix},$$

which actually can only be achieved at very few, individual points in the lens in practice. In the general case, the matrix $$S_\Delta = \begin{pmatrix} S_{11} & S_{12} \\ S_{12} & S_{22} \end{pmatrix}$$

is different from zero and symmetrical. Preferably, it is parameterized in the following form:

$$S_\Delta = \begin{pmatrix} Sph_\Delta - \dfrac{Cyl_\Delta}{2}\cos 2\Psi_\Delta & -\dfrac{Cyl_\Delta}{2}\sin 2\Psi_\Delta \\ -\dfrac{Cyl_\Delta}{2}\sin 2\Psi_\Delta & Sph_\Delta + \dfrac{Cyl_\Delta}{2}\cos 2\Psi_\Delta \end{pmatrix} \quad (4)$$

Here, $Sph_\Delta$ is the spherical equivalent of the refraction deviation, $Cyl_\Delta$ the error cylinder and $\Psi_\Delta$ the axis position thereof. Preferably, with a given matrix, the variables $Sph_\Delta$ and $Cyl_\Delta$ are determined from the eigenvalue of $S_\Delta$, particularly by:

$$Sph_\Delta = \frac{S_{11} + S_{22}}{2} \quad (5)$$

$$Cyl_\Delta = \sqrt{4S_{12}^2 + (S_{11} - S_{22})^2}$$

Preferably, these calculated variables are taken into account and used as actual values of the optimization at the respective penetration points, i.e.

$$D_{actual}(i) = Sph_\Delta(i)$$

$$A_{actual}(i) = Cyl_\Delta(i) \quad (6)$$

The vergence matrix $S_{SK}$ at the vertex sphere is preferably determined by $$S_{SK} = R_2 S_2' \cdot \left[1 - \left(e - \frac{1}{kS}\right)S_2'\right]^{-1} R_2^{-1} \quad (7)$$

from the vergence matrix $S'_2$ at the penetration point of the backside. $S'_2$, in turn, is preferably determined by means of a method for tracing a wavefront through the two lenses, which is described by the dependencies of table 1. Here, the individual factors (always to be evaluated at the penetration points of the main ray through the surfaces) mean:

TABLE 1

| mathematical formulas for evaluating the result in equation (7) | |
|---|---|
| index 1, 2 unprimed/primed variables | relating to front surface and rear surface evaluated on the object-side/image-side of the respective surface |
| $S'_i = T_i S_i T_i + \tilde{D}_i$, i = 1, 2 | curvature matrices of the wavefronts after refraction on the $i^{th}$ surface according to Snell's law, taking the oblique incidence into account |
| $S_2 = R_{12}^{-1} N_e S'_1 R_{12}$ | curvature matrix of the wavefront incident on the rear surface, to be calculated after transfer from the front surface |
| $S_1 = \dfrac{1}{s_1}\mathbf{1}$ | curvature matrix of the incident (spherical) wavefront on the front surface (1 stands for the 2X2 identity matrix) |
| $N_e^{-1} = 1 - \dfrac{d}{n}S'_1$ | inverse matrix of the "shape magnification" |
| $\tilde{D}_i = v_i C_i'^{-1} D_i C_i'^{-1}$, i = 1, 2 | Corrected expression for the surface refractive power matrix of the $i^{th}$ surface, taking into account the oblique incidence |
| $T_i = C_i C_i'^{-1}$, i = 1, 2 $C_i = \begin{pmatrix} \cos\alpha_i & 0 \\ 0 & 1 \end{pmatrix}$, i = 1, 2 $C_i' = \begin{pmatrix} \cos\alpha_i' & 0 \\ 0 & 1 \end{pmatrix}$, i = 1, 2 | 2X2 inclination matrix for taking into account the influence of oblique incidence on the $i^{th}$ surface on the refracted wavefront |
| $R_2 = R(\phi_2)$ | 2X2 rotation matrix (within the plane perpendicular to the object-side main ray) from the system of the rear surface (defined by the vector perpendicular to the refraction plane) to the corresponding reference direction to which the axis position of the eye has to be referred to either, taking Listing's rule into account |
| $R_{12} = R(\phi_{12})$ | 2X2 rotation matrix within the plane perpendicular to the main ray between the surfaces transferring the vector perpendicular to the refraction plane on the front surface into the corresponding vector on the rear surface |

TABLE 1-continued mathematical formulas for evaluating the result in equation (7)

$$R(\varphi) = \begin{pmatrix} \cos\varphi & -\sin\varphi \\ \sin\varphi & \cos\varphi \end{pmatrix}$$ shape of the 2X2 rotation matrix $$D_i = \begin{pmatrix} Sph_i - \frac{Cyl_i}{2}\cos2\Psi_i & -\frac{Cyl_i}{2}\sin2\Psi_i \\ -\frac{Cyl_i}{2}\sin2\Psi_i & Sph_i - \frac{Cyl_i}{2}\cos2\Psi_i \end{pmatrix}$$ surface refractive power matrix of the $i^{th}$ surface $\alpha_i, \alpha'_i$  angles of incidence and reflection on the $i^{th}$ surface $$Sph_1 = (n-1)\frac{1}{2}\left(\frac{1}{r_1^a} + \frac{1}{r_1^b}\right)$$ spherical equivalent of the front surface $$Cyl_1 = (n-1)\frac{1}{2}\left|\frac{1}{r_1^a} - \frac{1}{r_1^b}\right|$$ cylinder of the front surface $$Sph_2 = (1-n)\frac{1}{2}\left(\frac{1}{r_2^a} + \frac{1}{r_2^b}\right)$$ spherical equivalent of the rear surface $$Cyl_2 = (1-n)\frac{1}{2}\left|\frac{1}{r_2^a} - \frac{1}{r_2^b}\right|$$ cylinder of the rear surface $r_i^a, r_i^b$  main radii of curvature of the $i^{th}$ surface
$\Psi_i$  angle between the normal vector s of the refraction plane on the $i^{th}$ surface and the direction s in which the stronger-curved principal meridian ends $$v_1 = \frac{n\cos\alpha'_1 - \cos\alpha_1}{n-1}$$ correction factor for taking into account the oblique incidence on the front surface (causes consistency with Coddington's equations, Diepes, page 125)

$$v_2 = \frac{\cos\alpha'_2 - n\cos\alpha_2}{1-n}$$ correction factor for taking into account the oblique incidence on the backs surface $s_1$  scalar entrance vertex length
$d$  oblique thickness
$e$  oblique distance from the cornea to the penetration point on the rear surface
$kS$  curvature of the vertex sphere According to a preferred embodiment, the refractive power and/or astigmatism is/are locally obtained or determined by means of this method. In order to determine the imaging properties at one evaluation point, preferably only the first and second derivatives of the surface are determined at this local point.

Preferably, a surface description for the aspherical surface is used in which a change of a coefficient describing the surface only has local effects. Particularly preferable, a B-spline representation is used here. The elements of the Jacobian matrix are the derivatives of the imaging properties at each evaluation point i with respect to each coefficient j of surface representation. By use of a B-spline surface representation and local wavefronts, a specific structure of the Jacobian matrix advantageously arises, in which most of the elements of the Jacobian matrix have the value zero, since the coefficients only have a local effect and the imaging properties can be determined from the local surface properties as well. Thus, a high number of evaluation points, i.e. a high local resolution, can be used in the design of a spectacle lens, whereby accuracy can be improved. Preferably, more than 5000 evaluation points and 2000 coefficients are used in the optimization of a progressive spectacle lens.

Particularly preferable, a method is used as an optimizing method which makes use of the sparse structure of the Jacobian matrix. Particularly preferable, the method according to NG-Peyton is used.

By use of a faster method for calculating higher-order aberrations, it is made possible to construct a spectacle lens taking the aberrations of the eye suitably into account.

A correction of higher-order aberrations is important to vision. Thus, in the assessment of spectacle lenses, the consideration of higher-order aberrations, in particular coma and spherical aberration, plays an important role as well. In particular, it is taken into account that the visual performance by correction of aberrations up to e.g. including the $5^{th}$ order lead to an increase in image quality. It is particularly taken into account that higher-order aberrations vary strongly individually, i.e. from spectacle wearer to spectacle wearer, which is why an individual correction is preferably performed. Preferably, it is taken into account that the rotationally symmetric term of the spherical aberration differs from 0 in the average population. Therefore, in a preferred embodiment, an at least partially average correction is performed and taking into account.

Accordingly, in persons with a normal aberration, a fundamental improvement of the optical quality cannot only be expected due to the correction of sphere, cylinder and spherical aberration, but also due to the additional correction of higher-order aberrations. Preferably, it is calculated how many persons of a group profit how much from the correction of specific aberrations, in particular expressed in the so-called Strehl ratio.

In particular, it is taken into account that no stationary stop is provided in a spectacle lens in contrast to contact lenses, intraocular lenses or optical systems. Thus, a spectacle lens differs fundamentally from optical instruments, such as objectives, in that the aperture stop (entrance pupil of the eye, EP) is not stationary. During sight deviations, the entrance pupil of the eye rotates about the ocular center of rotation Z', while the spectacle lens remains stationary (see FIG. 1). In contact lenses and in particular intraocular lenses, however, the lens rotates to the same extent as the entrance pupil.

Moreover, the distance between the spectacle lens and the ocular center of rotation is larger than the distance between the lens (KL or IOL) and the EP. In a spectacle lens, due to the great distance, a change of field angle (inclination of the main ray with respect to the optical axis or zero direction of sight) directly leads to a large radial distance of the penetration point of the main ray through the spectacle lens to the spectacle lens center. However, in the IOL or KL, the effect on the radial distance of the penetration point is relatively small. In the viewing eye, the field angle is referred to as viewing angle, and in the static eye as visual field angle or visual angle.

In particular, an influence of the correction of higher orders on lower orders is taken into account. Thus, in particular a fullcorrection for all viewing angles is not possible. The correction of higher-order aberrations for the central, straight-ahead vision in particular leads to second-order aberrations (refractive power and astigmatism) for the peripherally viewing eye.

The coma represents a function of the cube of the radial component r. Thus, it substantially corresponds to the first derivative of the refractive power. It is thus clear that a correction of coma implicitly directly leads to a change of refractive power accompanied by an increase in distance r. The spherical aberration represents a function of the fourth power of the distance r and thus substantially corresponds the second derivative of the refractive power.

If one ignores the dependence on the angle and only takes a look at the dependence on the radial distance r, the aberration function W as a power or exponential series is preferably as follows:

$$W(r) = \sum_i \frac{S_i}{i!} r^i = S_1 * r + \frac{S_2}{2} * r^2 + \frac{S_3}{6} * r^3 + \frac{S_4}{24} * r^4 \dots$$

where
S1 substantially corresponds to the prism $P_0$.
S2 substantially corresponds to the refractive power $D_0$.
S3 substantially corresponds to the coma $K_0$.
S4 substantially corresponds to the spherical aberration $SA_0$.

Now, if the eye makes a sight deviation behind the spectacle lens and looks through the spectacle lens at a point r unequal 0, the following changes with respect to the centrally viewing eye preferably substantially result:
prism:

$$P(r) = W'(r) - P_0$$
$$= S_2 * r + S_3 * r^2 / 2 + S_4 * r^3 / 6 \dots$$
$$= D0 * r + K_0 * r^2 / 2 + SA_0 * r^3 / 6 \dots$$

For a spherical spectacle lens (coma and spherical aberration=0), the known Prentice formula $P=r*D_0$ results, and thus the known linear connection between prismatic power and radial distance r. In particular, if a constant refractive power is given, the prismatic power changes linearly. Equivalently, if a coma is given, the refractive power changes linearly with the radius.

Refractive power:

$$D(r) = W''(r) - D_0$$
$$= S_3 * r + S_4 * r^2 / 2 \dots$$
$$= K_0 * r + SA_0 * r^2 / 2 \dots$$

If a coma correction is given, the refractive power changes linearly, and if a correction of the spherical aberration is given, the refractive power changes quadratically as a function of the radial distance r.

In particular, it is often not possible to correct coma and spherical aberration for the straight-ahead vision and to keep the refractive power constant for peripheral vision. This problem does not exist with intraocular lenses IOL and contact lenses KL. In IOL and KL, the viewing eye basically has no effect on the imaging. As described above, a change of the visual field angle has little influence on the penetration point in the KL or IOL. In addition, there is a great visus drop of the eye outside the fovea. Even with small viewing angles does the visus next to the fovea drop rapidly, whereby the refractive power aberrations are not noticed.

In the spectacle lens however, during sight deviations, the refractive power aberrations introduced by the higher-order correction have a peripheral effect on the vision, since imaging takes place in the fovea. In the static eye, the change of refractive power and astigmatism upon increase of the visual field angle is larger than in the IOL and KL, but also here, the influence of these aberrations is rather little due to the great visus drop outside the fovea.

FIG. 2 shows a spectacle lens having a relatively low spherical aberration of 0.025 micrometers in all visual points. Thereby, a preferably complete correction of a corresponding aberration is achieved. FIGS. 2 and 3 show an area of the spectacle lens from |x|, |y|≤10 mm. FIG. 3 shows the spherical aberration of this spectacle lens. Until |x|, |y|=10 mm, one has a spherical aberration of 3 D. Thus, the spectacle lens cannot be used in the periphery. Even the correction of a low spherical aberration leads to an unusable spectacle lens. A complete correction of the higher-order aberrations is therefore not practical, since thereby the low-order aberrations are unreasonably deteriorated.

In order to not deteriorate the low-order aberrations unreasonably, preferably only a partial correction of the higher-order aberrations is performed. In a preferred embodiment of the present invention, the aberration function of the pupil is transformed to the spectacle lens by substituting the spectacle lens radius for the distance r. Thereby, the aberration coefficient c of each aberration is scaled down. The advantage of this method is that the aberration function has the same value as in the pupil $r/r_{pupil}$ at each point of the spectacle lens $r/r_{spectacle\ lens}$.

$$\Delta z(r, \vartheta) = \sum_i c_i Z_i\left(\frac{r}{r_{pupil}}, \vartheta\right)$$

$$\Delta z(r, \vartheta) = \sum_i c_i Z_i\left(\frac{r}{r_{spectaclelens}}, \vartheta\right)$$

By means of this method, as can be seen in FIG. 4, the correction of the low orders is not unreasonably deteriorated by the correction of the higher orders. FIG. 4 shows the astigmatism of a spectacle lens in which the spherical aberration of c=0.5 has been corrected for a spectacle lens diameter of 40 mm ($r_{spectacle\ lens}$=20 mm). One can see that even at the edge, the astigmatic aberration is less than 0.5 D with r=30 mm.

However, the higher-order aberrations are not corrected completely. If one selects the radius of the pupil as standard radius for the correction function, one achieves full correction. Preferably, a suitable and desired value r (standard radius) being between the radius of the pupil and the radius of the spectacle lens is selected for the transformation and scaling. In this way, the scaling can be set arbitrarily. Preferably, a compromise is made with respect to the correction of aberrations of different orders. Preferably, the compromise is found in that the individual aberrations are assessed and weighted for each direction of sight in a target function. In a preferred embodiment, a target function F of the following form is used:

$$F = \min \sum_i g_A(i) * (A_{actual}(i) - A_{target}(i))^2 + g_D(i) * (D_{actual}(i) - D_{target}(i))^2$$

where
$g_A(i)$=local weight of the astigmatism at the $i^{th}$ evaluation point;
$A_{actual}(i)$=actual local astigmatism at the $i^{th}$ evaluation point;
$A_{target}(i)$=required local astigmatism at the $i^{th}$ evaluation point;
$G_D(i)$=local weight of the refractive power at the $i^{th}$ evaluation point;
$D_{actual}(i)$=actual local refractive power at the $i^{th}$ evaluation point; and
$D_{target}(i)$=required local refractive power at the $i^{th}$ evaluation point.

As a possibility for correction higher-order aberrations, it is particularly proposed to perform the optimization by means of a target function, wherein the higher-order aberrations are suitably taken into account in the target function. As described above, a spectacle lens differs from other solutions of the technical optics in that the aperture stop is not stationary with respect to the optical system. Therefore, wavefronts are preferably calculated and evaluated for many directions of sight.

Preferably, the higher-order aberrations are taken into account in the target function.

In a preferred embodiment, the higher-order aberrations (e.g. coma, trefoil, spherical aberration) are individually taken into account and weighted (equivalently to the astigmatism and refractive power) in addition to the astigmatism and refractive power.

In a further preferred embodiment, the values of RMS (route mean square) of the wave aberration function, the point spread function (PSF), the modulation transmission function (MTF), or equivalent criteria are taken into account in the target function in addition to the astigmatism and refractive power or as sole items.

In a preferred embodiment, the optimization of a spectacle lens comprises a wave tracing method. In particular, local wavefronts are determined, and the higher-order aberrations are calculated on the basis of local derivatives of the incoming wavefront and the refractive surface.

Preferably, each spectacle lens is optimized individually online. The method for calculating the higher-order aberrations according to the prior art, as is e.g. described in DE 102 50 093, is based on ray tracing. The disadvantage of ray tracing is the long computing time. However, in order to optimize a spectacle lens online by means of a target function, it is advantageous to provide a fast calculation method.

Preferably, in addition to refractive power and astigmatism, the higher-order aberrations are determined from the local properties of the wavefront as well. Preferably, the emerging wavefront is developed and represented with Zernike polynomials and/or a Taylor series and/or a different, suitable set of functions.

Preferably, the local property of an emerging wavefront is directly or indirectly determined from the local properties of the incident wavefront and the refractive surface.

By means of this method, only one ray, i.e. the main ray, needs to be calculated for each direction of sight. Ray tracing is very time-consuming, since it is an iterative method in which the intersection with the rear surface, the front surface and the pupil plane has to be determined each. If e.g. the aberrations of third and fourth order are to be calculated, at least 12 rays are necessary.

A further advantage of local wavefront tracing is that the tracing is limited locally. Since the properties are calculated from the local derivatives, only an infinitely small portion of the spectacle lens is considered in limit, which portion is used for calculation. Thereby, one achieves that the Jacobian matrix is very sparse, whereby the problem of optimization is reduced and can be solved much faster.

This is particularly advantageous if B-splines are used for surface representation, since with these splines, coefficients influence the surface only locally. A consequence of the use of wave tracing is that the Gaussian refractive power is calculated in principle, i.e. the "threadlike" area around the main ray. Only to a limited extent is it possible to infer the average refractive power across the entire pupil from this central refractive power. Equivalently, this applies to the higher aberrations as well. However, it is advantageous here that the pupil of the human eye is small and that the physical stop is superimposed by a sensory pupil (weighting function) in addition. This phenomenon is referred to as Stiles-Crawford effect and describes the sensitivity in dependence on the aperture angle.

In a simple embodiment of the present invention, an unweighted adaptation of e.g. Zernike polynomials to the aberration function is performed. In a preferred embodiment, however, the sensory stop is taken into account as well. Particularly preferable, in order to take the Stiles-Crawford effect into account, a weight function is introduced which suppresses the overevaluation of the pupil edge. If this weight function is taken into account in the orthogonalization scheme for Zernike polynomials, one obtains a new set of polynomials which image the physiological reality better.

Preferably, the aberration is determined and/or corrected by taking into account a particularly individual pupil size or depending on a particularly individual pupil size. In particular, it is taken into account that the total quantity of the higher-order aberrations increases as the pupil size increases. Accordingly, the total quantity of the measurable aberration depends on the pupil size during the measuring procedure. Furthermore, the correction of aberrations with a large pupil leads to more improvement of the optical impression than the correction of the aberrations with a small pupil. In a preferred embodiment, both pupil sizes in which the aberrations make themselves felt and common pupil sizes are taken into account. The pupil size depends on many factors (e.g. environmental brightness, autonomic nervous system, and age, see picture) and is interindividually different. In general, the pupil size depends on the age. The interindividual variation is approx. 4 mm, irrespective of the age.

An interaction or correlation of accommodation, convergence and near miosis (near triad) is influenced by physiological circumstances (e.g. age-dependent change of near triad). Accordingly, due to the interaction of accommodation, convergence and near miosis, convergence and accommodation have influence on the pupil size as well. Accordingly, for the correction of higher-order aberrations, a suitable pupil diameter is determined and selected preferably individually and taken into account when the spectacle lens is designed and optimized. Preferably, one or more of the following criteria are taken into account when a suitable pupil diameter is determined and selected:

i. age;
ii. several measurement results of the pupil size with different degrees of brightness;
iii. several measurement results of the pupil size with different conditions (influence of the autonomic nervous system);
iv. typical lighting with which the spectacles are to be used, e.g. driving at night;
v. typical distance at which the spectacles are to be used (near triad, further taking into account parameters that change the near triad)

Preferably, in the correction, in particular in the preferred use of the correction in near, an influence and change of the aberration by accommodation is taken into account. Preferably, a change of aberration for specific viewing angles at the visual points is taken into account.

Since a certain degree of monochromatic aberrations can be advantageous to vision (e.g. for controlling the accommodation or in the case of astigmatism for visus), preferably not every aberration determined by a measuring device is corrected fully. Instead, it is rather taken into account which compatibility can be expected, which aberrations are to be corrected to what extent and how different aberrations interact with others. Preferably, by taking into account the mentioned interactions and reactions, the largest individual gain for the visual performance is obtained.

Preferably, this is partly achieved by
simulation of the correction of higher-order aberrations; and/or
subjective assessment of the correction of higher-order aberrations the extents of which are fully or partly corrected; and/o
subjective assessment of the interaction of corrections of different aberrations; and/or
individual assessment of vision quality, vision comfort with simulation of the correction of aberrations.

Preferably, the correction of higher-order aberrations is subjectively assessed spontaneously and/or after adaptation. Physiological findings on compatibility/advantages to be expected due to the correction of higher-order aberrations are preferably collected in a database with which it is then possible to both make predictions as to spontaneous compatibility and that subsequent to adaptation.

Geometrical optics particularly deals with the field of optics special in that the wavelength (limit transition $\lambda \to 0$) is neglected. It is assumed that the light consists of rays. In particular, a light ray is an imaginary, infinitely small bundle of light, the direction of which is determined by the normal of the wave or wavefront. The Malus-Dupin theorem states that a ray will still be perpendicular to the surface of equal optical path length even after any number of refractions or reflections. This surface of equal optical path length is referred to as wavefront. Fermat's principle of the shortest light path states that the optical wavelength $$\int_{P_0}^{P_1} n ds$$

of a ray between two points $P_0$, $P_1$ is shorter than any other connection curve. From this, preferably the refraction and reflection laws and the connection can be derived that in a perfect mapping, as is particularly schematically illustrated in FIG. 5, the optical path length from the object point to the image point is the same for all rays. FIG. 5 shows the propagation of wavefronts from one object point to an image point through an optical lens, in particular a preferred spectacle lens. FIG. 5 particularly shows a mapping of an object point in an image point on a lens with two surfaces with the refractive powers D1, D2 and the center thickness d. The circular lines represent individual wavefronts.

Snell's law of refraction reads n' sin $\epsilon'$=n sin $\epsilon$ and is particularly shown in FIG. 6. Preferably, this is formulated as follows:

$$n'|\vec{N}'\times\vec{N}_s|=n|\vec{N}\times\vec{N}_s|.$$

Preferably, a transformation for a vectorial representation of the law of refraction is performed as follows:

$$\vec{N}'(\vec{N},\vec{N}_S) = \mu\vec{N} + \gamma(\vec{N},\vec{N}_S)\vec{N}_S$$

$$\gamma(\vec{N},\vec{N}_S) = -\mu\vec{N}\cdot\vec{N}_S + \sqrt{1-\mu^2(1-(\vec{N}\cdot\vec{N}_S)^2}$$

$$\mu = \frac{n}{n'}$$

This representation describes particularly the direction vector of the emerging ray as a function of the direction of the incident ray and the surface normal of the refractive surface. Preferably, determining and specifying an aberration function, in particular the aberration function of the at least one eye of the spectacle wearer and/or the aberration function of the spectacle lens, developing the aberration function in a power series depending on parameters h', r and θ such that the following holds true:

$$W(h',r,\theta) = \sum_{l=0}^{\infty}\sum_{n=l}^{\infty}\sum_{m=0}^{n} a_{2l+m,n,m} h'^{2l+m} r^n \cos^m\theta,$$

where h' is the distance from the optical axis in the image plane, r is the distance from the optical axis in the pupil plane and θ is the angle between the x axis and the path r in the pupil plane.

The order of an aberration is in particular denoted by i=2l+m+n and is in particular straight. The errors with i=4 are particularly referred to as primary or Seidel aberrations.

| l | n | m | 2l + m | aberration term | aberration name |
|---|---|---|---|---|---|
| 0 | 4 | 0 | 0 | $a_{0,4,0}r^4$ | spherical aberration |
| 0 | 3 | 1 | 1 | $a_{1,3,1}h'r^3\cos\theta$ | coma |
| 0 | 2 | 2 | 2 | $a_{2,2,2}h'^2 r^2 \cos^2\theta$ | astigmatism |
| 1 | 2 | 0 | 2 | $a_{2,2,0}h'^2 r^2$ | field curvature |
| 1 | 1 | 1 | 3 | $a_{3,1,1}h'^3 r\cos\theta$ | distortion |

The aberrations with i=6 are particularly referred to as secondary or Schwarzschild aberrations.

| l | n | m | 2l + m | aberration term | aberration name |
|---|---|---|---|---|---|
| 0 | 6 | 0 | 0 | $a_{0,6,0}r^6$ | secondary spherical aberration |
| 0 | 5 | 1 | 1 | $a_{1,5,1}h'r^5\cos\theta$ | secondary coma |
| 0 | 4 | 2 | 2 | $a_{2,4,2}h'^2 r^4 \cos^2\theta$ | secondary astigmatism |
| 0 | 3 | 3 | 3 | $a_{3,3,3}h'^3 r^3 \cos^3\theta$ | arrow |
| 1 | 4 | 0 | 2 | $a_{2,4,0}h'^2 r^4$ | lateral spherical aberration |
| 1 | 3 | 1 | 3 | $a_{3,3,1}h'^3 r^3 \cos\theta$ | lateral coma |
| 1 | 2 | 2 | 4 | $a_{4,2,2}h'^4 r^2 \cos^2\theta$ | lateral astigmatism |
| 2 | 2 | 0 | 4 | $a_{4,2,0}h'^4 r^2$ | lateral field curvature |
| 2 | 1 | 1 | 5 | $a_{5,1,1}h'^5 r\cos\theta$ | lateral distortion |

Correspondingly, the aberrations with i=8 are referred to as tertiary aberrations.

In a preferred embodiment, a higher-order aberration taken into account in a method for designing and fabricating a spectacle lens comprises one or more of the above-mentioned primary and/or secondary and/or tertiary aberrations. For the imaging of an individual object point, the power series is represented preferably without explicit dependence on h' by $$W(r,\theta) = \sum_{n=0}^{\infty}\sum_{m=0}^{n} a_{n,m} r^n \cos^m\theta$$

and represents in particular a parameterization of the wavefront.

The associated primary and secondary aberrations up to the sixth order n are listed in the table below.

| N | m | aberration term | aberration name |
|---|---|---|---|
| 1 | 1 | $a_{1,1}r\cos\theta$ | distortion |
| 2 | 0 | $a_{2,0}r^2$ | refractive power |
| 2 | 2 | $a_{2,2}r^2\cos^2\theta$ | astigmatism |
| 3 | 1 | $a_{3,1}r^3\cos\theta$ | coma |
| 3 | 3 | $a_{3,3}r^3\cos^3\theta$ | arrow |
| 4 | 0 | $a_{4,0}r^4$ | spherical aberration |
| 4 | 2 | $a_{4,2}r^4\cos^2\theta$ | secondary astigmatism |
| 5 | 1 | $a_{5,1}r^5\cos\theta$ | secondary coma |
| 6 | 0 | $a_{6,0}r^6$ | secondary spherical aberration |

If one now takes a look at an infinitesimal area around the optical axis (r->0), one arrives at the Gaussian optics (or paraxial optics). One obtains for the second-order aberrations (refractive power) in the refraction of a spherical wavefront on a spherical surface the vertex length equation (FIG. 7).

FIG. 7 illustrates the refraction of a spherical wavefront on a spherical surface. Here, a spherical wavefront is incident on a preferably at least local spherical surface (D) in a perpendicular manner. Preferably, as vertex length equation applies:

$$S' = S + D$$

$$\text{with } S = \frac{n}{s}$$

$$D = \frac{n'-n}{r} = (n'-n)K$$

$$S' = \frac{n'}{s'}$$

Here, in particular s is the object-side vertex length (distance from the object point to the refractive surface) and corresponds to the radius of curvature of the incoming wavefront. s' is in particular the image-side vertex length (distance from the image point to the refractive surface) and corresponds to the radius of curvature of the emerging wavefront. r is the radius of curvature of the refractive surface (distance from the center of the refractive surface to the refractive surface). n is the refractive index of the medium on the object side. n' is the refractive index of the medium on the image side.

Preferably, this representation is extended to the case of oblique incidence of the wavefront on an astigmatic surface. A spherical wavefront is incident obliquely on a spherical surface or an astigmatic surface in which a principal direction of curvature coincides with the refraction plane.

$$S'_x = S + D_x \frac{n'\cos\varepsilon' - n\cos\varepsilon}{n'-n}$$

$$S'_y\cos^2\varepsilon' = S\cos^2\varepsilon + D_y \frac{n'\cos\varepsilon' - n\cos\varepsilon}{n'-n}$$

where $\varepsilon$=incidence angle, $\varepsilon'$=reflection angle

These equations are also referred to as "Coddington equation". $S'_y$, $D_y$ correspond, preferably analogously to the vertex length equation, to the reciprocal values of the distances in the refraction plane, and $S'_x$, $D_x$ correspondingly perpendicular to the refraction plane.

The most complex second-order case is when an astigmatic wavefront is incident on an astigmatic surface in an oblique manner, in which neither the principal directions of curvature of the surface and the incoming wavefront correspond to each other nor these correspond to the refraction plane. This case is illustrated in FIG. 8. For example, FIG. 8 in particular illustrates a transition to the oblique incidence and the leaving of the rotational symmetry. This leads in particular to the general Coddington equation:

$$C'S'C' = CSC + \frac{n'\cos\varepsilon' - n\cos\varepsilon}{n'-n}D$$

$$S = \begin{pmatrix} S_{xx} & S_{xy} \\ S_{xy} & S_{yy} \end{pmatrix} = \begin{pmatrix} \left(S+\frac{Z}{2}\right) - \frac{Z}{2}\cos 2\alpha & -\frac{Z}{2}\sin 2\alpha \\ -\frac{Z}{2}\sin 2\alpha & \left(S+\frac{Z}{2}\right) + \frac{Z}{2}\cos 2\alpha \end{pmatrix}$$

$$C = \begin{pmatrix} 1 & 0 \\ 0 & \cos\varepsilon \end{pmatrix}$$

-continued $$C' = \begin{pmatrix} 1 & 0 \\ 0 & \cos\varepsilon' \end{pmatrix}$$

and S' correspondingly.

Local properties are exact for the local differential region and a good approximation for a small region in particular if the higher derivatives are small. Preferably, power vectors are used to describe a spherocylindrical power of a refractive surface, in particular the front and/or the rear surface of the spectacle lens, or the wavefront. As for the representation of power vectors, particular reference is made to Harris W. "Power Vectors Versus Power Matrices, and the Mathematical Nature of Dioptric Power", OWS 11/2007.

As basic components of the vector, preferably the normal curvature in the x direction $\kappa_N$, the geodetic torsion in the x direction $\tau$ and the normal curvature in the y direction $\kappa_N$ are used. Then, the vector with the corresponding spherocylindrical components is represented by:

$$\begin{pmatrix} S_{xx} \\ S_{xy} \\ S_{yy} \end{pmatrix} = \begin{pmatrix} \left(S + \frac{Z}{2}\right) - \frac{Z}{2}\cos 2\alpha \\ -\frac{Z}{2}\sin 2\alpha \\ \left(S + \frac{Z}{2}\right) + \frac{Z}{2}\cos 2\alpha \end{pmatrix}$$

With this notation, the Coddington equation can be written in a very simple manner:

$$C'\vec{S}' = C\vec{S} + \vec{D}\frac{n'\cos\varepsilon' - n\cos\varepsilon}{n' - n}$$

$$\vec{S}' = \begin{pmatrix} S'_{xx} \\ S'_{xy} \\ S'_{yy} \end{pmatrix}$$

$$\vec{S} = \begin{pmatrix} S_{xx} \\ S_{xy} \\ S_{yy} \end{pmatrix}$$

$$\vec{D} = \begin{pmatrix} D_{xx} \\ D_{xy} \\ D_{yy} \end{pmatrix}$$

$$C' = \begin{pmatrix} 1 & 0 & 0 \\ 0 & \cos\varepsilon' & 0 \\ 0 & 0 & \cos^2\varepsilon' \end{pmatrix}$$

$$C = \begin{pmatrix} 1 & 0 & 0 \\ 0 & \cos\varepsilon & 0 \\ 0 & 0 & \cos^2\varepsilon \end{pmatrix}$$

In the following, two different preferred methods for describing and determining a wavefront particularly coming from an object point, a refractive surface, in particular the front and/or the rear surface of the spectacle lens, and the outgoing wavefront are described. Preferably, the inventive method for designing and fabricating a spectacle lens in a preferred embodiment comprises one or more of these preferred methods for describing and determining a wavefront or at least one surface of the spectacle lens.

A first one of these preferred embodiments comprises specifying three local Cartesian coordinate systems. Here, a first coordinate system (x, y, z) is assigned to an incoming wavefront, a second coordinate system $(x_s, y_s, z_s)$ to the refractive surface, and a third coordinate system (x', y', z') to the outgoing or emerging wavefront. FIG. 9 shows the three local coordinate systems of the surface, the incoming and outgoing wavefront, according to a preferred embodiment. The z axis (or $z_s$ axis, z' axis) respectively corresponds to the direction or the normal of the incoming and outgoing wavefront (or the incoming and outgoing main ray) of the refractive surface. The x axis (or $x_s$ axis, x' axis) is perpendicular to the refraction plane (drawing plane in FIG. 9) and is thus identical in all coordinate systems. The y axis (or $y_s$ axis, y' axis) is perpendicular to the x and z axes (or $x_s$ and $z_s$ axes, x' and z' axes) and thus lies within the refraction plane.

Preferably, a coordinate transformation is performed in order to switch from one of these preferred coordinate systems into another, and vice versa. Preferably, the coordinate transformation represents a rotation about the x axis about the angles of incidence and reflection.

$$Rot(\varepsilon) = \begin{bmatrix} 1 & 0 & 0 \\ 0 & \cos\varepsilon & -\sin\varepsilon \\ 0 & \sin\varepsilon & \cos\varepsilon \end{bmatrix}$$

$$Rot(\varepsilon') = \begin{bmatrix} 1 & 0 & 0 \\ 0 & \cos\varepsilon' & -\sin\varepsilon' \\ 0 & \sin\varepsilon' & \cos\varepsilon' \end{bmatrix}$$

Furthermore, the following relation exists between the coordinate y of the incoming wavefront, the coordinate $y_s$ of the refractive surface and the coordinate y' of the outgoing wavefront:

$$y(y_s) = y_s \cos\varepsilon$$

$$y'(y_s) = y_s \cos\varepsilon'$$

The relation of the local coordinate systems is once again illustrated in FIG. 10 for the incoming wavefronts ($WF_{in}$) and the outgoing wavefronts ($WF_{out}$) belonging to one main ray (HS).

In another preferred embodiment, the method for designing and fabricating a spectacle lens comprises specifying a global coordinate system. Preferably, the global coordinate system corresponds to the local coordinate system of the surface. Here, the z axis is identical with the surface normal of the refractive surface, in particular the front and/or the rear surface of the spectacle lens. No coordinate transformation is required then.

In the case of a global coordinate system, the following relation exists between the coordinate y of the incoming wavefront, the coordinate $y_s$ of the refractive surface and the coordinate y' of the outgoing wavefront, as is illustrated in FIG. 11 for the incoming wavefronts ($WF_{in}$) and the outgoing wavefronts ($WF_{out}$) belonging to one main ray (HS).

$$y(y_s) = y_s \cos^2\varepsilon$$

$$y'(y_s) = y_s \cos^2\varepsilon'$$

As explained above, the wavefronts and/or surfaces, in particular the front and/or the rear surface of the spectacle lens, are described and represented preferably by power or exponential series. The above-described aberration function or wavefront for a fixed object point with the parameters r and θ:

$$W(r, \theta) = \sum_{n=0}^{\infty} \sum_{m=0}^{n} a_{n,m} r^n \cos^m \theta$$

is represented in the Cartesian coordinate system preferably in similar manner by $$W(x, y) = \sum_{n=1}^{\infty} \sum_{m=0}^{n} \frac{a_{m,n-m}}{n!} x^m y^{n-m},$$

wherein in particular the constant term preferably not required in the further contemplation is disregarded and a normalization by the faculty n takes place in addition. The following table lists the primary aberrations up to the $4^{th}$ order in accordance with this preferred representation, wherein preferably one or more of these aberration terms are taken into account in the design and fabrication of the spectacle lens.

| N | m | n-m | aberration term | aberration name |
|---|---|-----|-----------------|-----------------|
| 1 | 1 | 0 | $a_{1,0}x$ | Prism$_x$ |
| 1 | 0 | 1 | $a_{0,1}y$ | Prism$_y$ |
| 2 | 2 | 0 | $\frac{a_{2,0}}{2}x^2$ | Sph$_{xx}$ |
| 2 | 1 | 1 | $\frac{a_{1,1}}{2}xy$ | Sph$_{xy}$ |
| 2 | 0 | 2 | $\frac{a_{0,2}}{2}y^2$ | Sph$_{yy}$ |
| 3 | 3 | 0 | $\frac{a_{3,0}}{3}x^3$ | Coma$_{xxx}$ |
| 3 | 2 | 1 | $\frac{a_{2,1}}{3}x^2y$ | Coma$_{xxy}$ |
| 3 | 1 | 2 | $\frac{a_{1,2}}{3}xy^2$ | Coma$_{xyy}$ |
| 3 | 0 | 3 | $\frac{a_{0,3}}{3}y^3$ | Coma$_{yyy}$ |
| 4 | 4 | 0 | $\frac{a_{4,0}}{4}x^4$ | Sph.Aberration$_{xxxx}$ |
| 4 | 3 | 1 | $\frac{a_{3,1}}{4}x^3y$ | Sph.Aberration$_{xxxy}$ |
| 4 | 2 | 2 | $\frac{a_{2,2}}{4}x^2y^2$ | Sph.Aberration$_{xxyy}$ |
| 4 | 1 | 3 | $\frac{a_{1,3}}{4}xy^3$ | Sph.Aberration$_{xyyy}$ |
| 4 | 0 | 4 | $\frac{a_{0,4}}{4}y^4$ | Sph.Aberration$_{yyyy}$ |

If three local coordinate systems are used, the first-order term is left out as well.

$$W(x, y) = \sum_{n=2}^{\infty} \sum_{m=0}^{n} \frac{a_{m,n-m}}{n!} x^m y^{n-m},$$

Thus, for the incoming wavefront up to the $6^{th}$ order it follows:

$$\vec{WF}_{In}(x, y) = \left( x, y, \sum_{n=2}^{6} \sum_{m=0}^{n} \frac{a_{m,n-m}}{n!} x^m y^{n-m} \right)$$

The associated local aberrations of the incoming wavefront result from a multiplication of the coefficient by the refractive index n:

Sph$_{xx}$=n$\alpha_{2,0}$; Sph$_{xy}$=n$\alpha_{1,1}$; Sph$_{yy}$=n$\alpha_{2,2}$; Coma$_{xxx}$=n$\alpha_{3,0}$ etc.

Equivalently for the refractive surface:

$$\vec{S}(x_S, y_S) = \left( x_S, y_S, \sum_{n=2}^{6} \sum_{m=0}^{n} \frac{a_{m,n-m}}{n!} x_S^m y_S^{n-m} \right)$$

The associated local aberrations of the refractive surface result from a multiplication of the coefficient by the refractive index difference n'−n:

Sph$_{Sxx}$=(n'−n)$\alpha_{2,0}$; Sph$_{Sxy}$=(n'−n)$\alpha_{1,1}$; Sph$_{Syy}$=(n'−n)$\alpha_{0,2}$; Coma$_{Sxxx}$=(n'−n)$\alpha_{3,0}$ etc.

and equivalently for the outgoing wavefront:

$$\vec{WF}_{Out}(x', y') = \left( x', y', \sum_{n=2}^{6} \sum_{m=0}^{n} \frac{a_{m,n-m}}{n!} x'^m y'^{n-m} \right)$$

The associated local aberrations of the outgoing wavefront result from a multiplication of the coefficient by the refractive index n':

Sph'$_{xx}$=n'$\alpha_{2,0}$; Sph'$_{xy}$=n'$\alpha_{1,1}$; Sph'$_{yy}$=n'$\alpha_{0,2}$; Coma'$_{xxx}$=n'$\alpha_{3,0}$ etc.

Preferably, designing and fabricating the spectacle lens comprises determining the aberration of the emerging or outgoing, eye-side wavefront. It is in particular determined depending on and on the basis of the aberration of the incoming wavefront and the aberration of the refractive surface, in particular the first and/or the second spectacle lens. Here, the procedure is as follows.

Preferably, determining the aberration of the outgoing wavefront comprises one or more, preferably all steps, in particular in the given order:

determining and calculating the normal of the incoming wavefront and the refractive surface from the first directional derivatives $$\vec{N}(x,y) = \frac{\frac{\partial \vec{WF}_{In}}{\partial x} \times \frac{\partial \vec{WF}_{In}}{\partial y}}{\left|\frac{\partial \vec{WF}_{In}}{\partial x} \times \frac{\partial \vec{WF}_{In}}{\partial y}\right|}$$

$$\vec{N}_S(x_S, y_S) = \frac{\frac{\partial \vec{S}}{\partial x_S} \times \frac{\partial \vec{S}}{\partial y_S}}{\left|\frac{\partial \vec{S}}{\partial x_S} \times \frac{\partial \vec{S}}{\partial y_S}\right|};$$

determining and calculating the normal of the outgoing wavefront with the refraction law $$\vec{N}'(\vec{N}, \vec{N}_S) = \mu\vec{N} + \gamma(\vec{N}, \vec{N}_S)\vec{N}_S$$
$$\gamma(\vec{N}, \vec{N}_S) = -\mu\vec{N}\cdot\vec{N}_S + \sqrt{1 - \mu^2(1 - (\vec{N}\cdot\vec{N}_S)^2}$$
$$\mu = \frac{n}{n'};$$

differentiating the normal of the outgoing wavefront with the refraction law $$\frac{\partial}{\partial y'}\vec{N}'(\vec{N}, \vec{N}_S)\frac{\partial^2}{\partial y'^2}\vec{N}'(\vec{N}, \vec{N}_S)usw.;$$

determining and calculating the normal of the description (power series) of the outgoing wavefront and correspondingly deriving the normal $$\vec{N}_{WF}(x', y') = \frac{\frac{\partial \vec{WF}_{Out}}{\partial x'} \times \frac{\partial \vec{WF}_{Out}}{\partial y'}}{\left|\frac{\partial \vec{WF}_{Out}}{\partial x'} \times \frac{\partial \vec{WF}_{Out}}{\partial y'}\right|}\frac{\partial}{\partial y'}\vec{N}_{WF}(x', y') \text{ etc.};$$

determining the coefficients ak of the emerging or outgoing wavefront in particular by equating the derivatives $$\frac{\partial}{\partial y'}\vec{N}'(\vec{N}, \vec{N}_S) = \frac{\partial}{\partial y'}\vec{N}_{WF}(x', y')usw.;$$

and/or
determining and calculating the aberrations from the coefficients ak.

$$z(y) = \sum_k \frac{a_k}{k!}y^k = \frac{a_2}{2}y^2 + \frac{a_3}{3}y^3 + \frac{a_4}{4}y^4 + \frac{a_5}{5}y^5 + \frac{a_6}{6}y^6 \ldots$$

with Sph=n·$a_2$ Coma=n·$a_3$ Sph.Aber.=n·$a_4$
Sec.Coma=n·$a_5$ Sec.Sph.Aber.=n·$a_6$ In the following, the relations of the individual parameters for aberrations of different orders, when viewed in a different number of dimensions, i.e. for different degrees of symmetry, are summarized for preferred embodiments of the present invention.

The refractive power and the astigmatism can be represented and determined one-dimensionally by imaging properties in the refraction plane by:
If the incoming wavefront is incident on the surface in a perpendicular manner: S'=S+D
If the incoming wavefront is incident in an oblique manner:

$$S'\cos^2\varepsilon' = S\cos^2\varepsilon + D\frac{n'\cos\varepsilon' - n\cos\varepsilon}{n' - n}$$

In two dimensions, if the wavefront is incident in a perpendicular manner, it follows for the vertex length equation (vergence equation)
in the case of a rotationally symmetric wavefront and surface:

$$S'=S+D;$$

in the case of an astigmatic wavefront and surface with parallel axes:

$$S'_x = S_x + D_x$$

and $$S'_y = S_y + D_y;$$

in the case of an astigmatic wavefront and surface with oblique axes (obliquely crossed cylinders):

$$S'_{xx} = S_{xx} + D_{xx}$$

$$S'_{xy} = S_{xy} + D_{xy}$$

$$S'_{yy} = S_{yy} + D_{yy}$$

In two dimensions, if the wavefront is incident in an oblique manner, it preferably follows
in the case of a spherical wavefront and surface:

$$S'_x = S + D\frac{n'\cos\varepsilon' - n\cos\varepsilon}{n' - n}$$
$$S'_y\cos^2\varepsilon' = S\cos^2\varepsilon + D\frac{n'\cos\varepsilon' - n\cos\varepsilon}{n' - n}$$

in the case of a spherical wavefront and astigmatic surface, however with a principal meridian direction parallel to the refraction plane:
Coddington equation:

$$S'_x = S + D_x\frac{n'\cos\varepsilon' - n\cos\varepsilon}{n' - n}$$
$$S'_y\cos^2\varepsilon' = S\cos^2\varepsilon + D_y\frac{n'\cos\varepsilon' - n\cos\varepsilon}{n' - n}$$

in the case of an astigmatic wavefront and astigmatic surface with oblique axes positions not corresponding to the refraction plane:
general Coddington equation:

$$C'S'C' = CSC + \frac{n'\cos\varepsilon' - n\cos\varepsilon}{n' - n}D$$

-continued $$S = \begin{pmatrix} S_{xx} & S_{xy} \\ S_{xy} & S_{yy} \end{pmatrix} = \begin{pmatrix} \left(S+\frac{z}{2}\right)-\frac{z}{2}\cos2\alpha & -\frac{z}{2}\sin2\alpha \\ -\frac{z}{2}\sin2\alpha & \left(S+\frac{z}{2}\right)+\frac{z}{2}\cos2\alpha \end{pmatrix}$$

$$C = \begin{pmatrix} 1 & 0 \\ 0 & \cos\varepsilon \end{pmatrix} \quad C' = \begin{pmatrix} 1 & 0 \\ 0 & \cos\varepsilon' \end{pmatrix}$$

If higher-order aberrations are taken into account, in one dimension, imaging properties in the refraction plane in the case of only a single error of one order of the surface and the wavefront are preferably determined as follows:
If the incoming wavefront is incident on the surface in a perpendicular manner:
Refractive power: S'=S+D (vertex length equation)
Coma: Coma'=Coma+ComaS
Spherical Aberration: Sph. Aberr.'=Sph. Aberr.+Sph. Aberr.S
Secondary Coma Sec.Coma'=Sec.Coma+Sec.ComaS
Secondary Sph.Aberration: Sec.Sph. Aberr.'=Sec.Sph. Aberr.+Sec.Sph. Aberr.S
The vertex length equation is preferably generalized by:

Error'=Error+ErrorS

If the incoming wavefront is incident in an oblique manner:
Refractive power:

$$S'\cos^2\varepsilon' = S\cos^2\varepsilon + D\frac{n'\cos\varepsilon' - n\cos\varepsilon}{n'-n}$$

Coma:

$$Coma'\cos^3\varepsilon' = Coma\cos^3\varepsilon + Coma_S\frac{n'\cos\varepsilon' - n\cos\varepsilon}{n'-n}$$

Spherical aberration:

$$Sph.Aber.'\cos^4\varepsilon' = Sph.Aber.\cos^4\varepsilon + Sph.Aber._S\frac{n'\cos\varepsilon' - n\cos\varepsilon}{n'-n}$$

Secondary coma:

$$Sec.Coma'\cos^5\varepsilon' = Sec.Coma\cos^5\varepsilon + Sec.Coma_S\frac{n'\cos\varepsilon' - n\cos\varepsilon}{n'-n}$$

Secondary Sph.Aberration:

$$Sec.Sph.Aber.'\cos^6\varepsilon' = Sec.Sph.Aber.\cos^6\varepsilon + Sec.Sph.Aber._S\frac{n'\cos\varepsilon' - n\cos\varepsilon}{n'-n}$$

The vertex length equation is preferably generalized by:

$$Error'(k)\cos^k\varepsilon' = Error(k)\cos^k\varepsilon + Error_S(k)\frac{n'\cos\varepsilon' - n\cos\varepsilon}{n'-n}$$

If higher-order aberrations are taken into account, in two dimensions, imaging properties in the case of only a single error of one order of the surface and the wavefront are preferably determined as follows:
Refractive power:

$$S'_{xx} = S_{xx} + D_{xx}\frac{n'\cos\varepsilon' - n\cos\varepsilon}{n'-n}$$

$$S'_{xy}\cos\varepsilon' = S_{xy}\cos\varepsilon + D_{xy}\frac{n'\cos\varepsilon' - n\cos\varepsilon}{n'-n}$$

$$S'_{yy}\cos^2\varepsilon' = S_{yy}\cos^2\varepsilon + D_{yy}\frac{n'\cos\varepsilon' - n\cos\varepsilon}{n'-n}$$

Coma:

$$Coma'_{xxx} = Coma_{xxx} + Coma_{S_{xxx}}\frac{n'\cos\varepsilon' - n\cos\varepsilon}{n'-n}$$

$$Coma'_{xxy}\cos\varepsilon' = Coma_{xxy}\cos\varepsilon + Coma_{S_{xxy}}\frac{n'\cos\varepsilon' - n\cos\varepsilon}{n'-n}$$

$$Coma'_{xyy}\cos^2\varepsilon' = Coma_{xyy}\cos^2\varepsilon + Coma_{S_{xyy}}\frac{n'\cos\varepsilon' - n\cos\varepsilon}{n'-n}$$

$$Coma'_{yyy}\cos^3\varepsilon' = Coma_{yyy}\cos^3\varepsilon + Coma_{S_{yyy}}\frac{n'\cos\varepsilon' - n\cos\varepsilon}{n'-n}$$

Spherical aberration:

$$SphAber'_{xxxx} = SphAber_{xxxx} + SphAber_{S_{xxxx}}\frac{n'\cos\varepsilon' - n\cos\varepsilon}{n'-n}$$

$$SphAber'_{xxxy}\cos\varepsilon' = SphAber_{xxxy}\cos\varepsilon + SphAber_{S_{xxxy}}\frac{n'\cos\varepsilon' - n\cos\varepsilon}{n'-n}$$

$$SphAber'_{xxyy}\cos^2\varepsilon' = SphAber_{xxyy}\cos^2\varepsilon + SphAber_{S_{xxyy}}\frac{n'\cos\varepsilon' - n\cos\varepsilon}{n'-n}$$

$$SphAber'_{xyyy}\cos^3\varepsilon' = SphAber_{xyyy}\cos^3\varepsilon + SphAber_{S_{xyyy}}\frac{n'\cos\varepsilon' - n\cos\varepsilon}{n'-n}$$

$$SphAber'_{yyyy}\cos^4\varepsilon' = SphAber_{yyyy}\cos^4\varepsilon + SphAber_{S_{yyyy}}\frac{n'\cos\varepsilon' - n\cos\varepsilon}{n'-n}$$

Secondary coma:

$$Sec.Coma'_{xxxxx} = Sec.Coma_{xxxxx} + Sec.Coma_{S_{xxxxx}}\frac{n'\cos\varepsilon' - n\cos\varepsilon}{n'-n}$$

$$Sec.Coma'_{xxxxy}\cos\varepsilon' = Sec.Coma_{xxxxy}\cos\varepsilon + Sec.Coma_{S_{xxxxy}}\frac{n'\cos\varepsilon' - n\cos\varepsilon}{n'-n}$$

$$Sec.Coma'_{xxxyy}\cos^2\varepsilon' = Sec.Coma_{xxxyy}\cos^2\varepsilon + Sec.Coma_{S_{xxxyy}}\frac{n'\cos\varepsilon' - n\cos\varepsilon}{n'-n}$$

$$Sec.Coma'_{xxyyy}\cos^3\varepsilon' = Sec.Coma_{xxyyy}\cos^3\varepsilon + Sec.Coma_{S_{xxyyy}}\frac{n'\cos\varepsilon' - n\cos\varepsilon}{n'-n}$$

$$Sec.Coma'_{xyyyy}\cos^4\varepsilon' = Sec.Coma_{xyyyy}\cos^4\varepsilon + Sec.Coma_{S_{xyyyy}}\frac{n'\cos\varepsilon' - n\cos\varepsilon}{n'-n}$$

$$Sec.Coma'_{yyyyy}\cos^5\varepsilon' = Sec.Coma_{yyyyy}\cos^5\varepsilon + Sec.Coma_{S_{yyyyy}}\frac{n'\cos\varepsilon' - n\cos\varepsilon}{n'-n}$$

Secondary sph. aberration:

$$Sec.SphAber'_{xxxxx} =$$
$$Sec.SphAber_{xxxxx} + Sec.SphAber_{Sxxxxx}\frac{n'\cos\varepsilon' - n\cos\varepsilon}{n' - n}$$

$$Sec.SphAber'_{xxxxy}\cos\varepsilon' =$$
$$Sec.SphAber_{xxxxy}\cos\varepsilon + Sec.SphAber_{Sxxxxy}\frac{n'\cos\varepsilon' - n\cos\varepsilon}{n' - n}$$

$$Sec.SphAber'_{xxxyy}\cos^2\varepsilon' =$$
$$Sec.SphAber_{xxxyy}\cos^2\varepsilon + Sec.SphAber_{Sxxxyy}\frac{n'\cos\varepsilon' - n\cos\varepsilon}{n' - n}$$

$$Sec.SphAber'_{xxyyy}\cos^3\varepsilon' =$$
$$Sec.SphAber_{xxyyy}\cos^3\varepsilon + Sec.SphAber_{Sxxyyy}\frac{n'\cos\varepsilon' - n\cos\varepsilon}{n' - n}$$

$$Sec.SphAber'_{xyyyy}\cos^4\varepsilon' =$$
$$Sec.SphAber_{xyyyy}\cos^4\varepsilon + Sec.SphAber_{Sxyyyy}\frac{n'\cos\varepsilon' - n\cos\varepsilon}{n' - n}$$

$$Sec.SphAber'_{xyyyyy}\cos^5\varepsilon' =$$
$$Sec.SphAber_{xyyyyy}\cos^5\varepsilon + Sec.SphAber_{Sxyyyyy}\frac{n'\cos\varepsilon' - n\cos\varepsilon}{n' - n}$$

$$Sec.SphAber'_{yyyyyy}\cos^6\varepsilon' =$$
$$Sec.SphAber_{yyyyyy}\cos^6\varepsilon + Sec.SphAber_{Syyyyyy}\frac{n'\cos\varepsilon' - n\cos\varepsilon}{n' - n}$$

For the preferred power vector notation, it particularly follows:

Refractive power:

$$C'\vec{S}' = C\vec{S} + \vec{D}\frac{n'\cos\varepsilon' - n\cos\varepsilon}{n' - n}$$

$$\vec{S}' = \begin{pmatrix} S'_{xx} \\ S'_{xy} \\ S'_{yy} \end{pmatrix} \quad \vec{S} = \begin{pmatrix} S_{xx} \\ S_{xy} \\ S_{yy} \end{pmatrix} \quad \vec{D} = \begin{pmatrix} D_{xx} \\ D_{xy} \\ D_{yy} \end{pmatrix}$$

$$C' = \begin{pmatrix} 1 & 0 & 0 \\ 0 & \cos\varepsilon' & 0 \\ 0 & 0 & \cos^2\varepsilon' \end{pmatrix} \quad C = \begin{pmatrix} 1 & 0 & 0 \\ 0 & \cos\varepsilon & 0 \\ 0 & 0 & \cos^2\varepsilon \end{pmatrix}$$

Coma:

$$C'\vec{K}' = C\vec{K} + \vec{K}_S\frac{n'\cos\varepsilon' - n\cos\varepsilon}{n' - n}$$

$$\vec{K}' = \begin{pmatrix} K'_{xxx} \\ K'_{xxy} \\ K'_{xyy} \\ K'_{yyy} \end{pmatrix} \quad \vec{K} = \begin{pmatrix} K_{xxx} \\ K_{xxy} \\ K_{xyy} \\ K_{yyy} \end{pmatrix} \quad \vec{K}_S = \begin{pmatrix} K_{Sxxx} \\ K_{Sxxy} \\ K_{Sxyy} \\ K_{Syyy} \end{pmatrix}$$

$$C' = \begin{pmatrix} 1 & 0 & 0 & 0 \\ 0 & \cos\varepsilon' & 0 & 0 \\ 0 & 0 & \cos^2\varepsilon' & 0 \\ 0 & 0 & 0 & \cos^3\varepsilon' \end{pmatrix} \quad C = \begin{pmatrix} 1 & 0 & 0 & 0 \\ 0 & \cos\varepsilon & 0 & 0 \\ 0 & 0 & \cos^2\varepsilon & 0 \\ 0 & 0 & 0 & \cos^3\varepsilon \end{pmatrix}$$

For a preferred generalization of the Coddington equation, it follows:

$$C'\vec{E}(k)' = C\vec{E}(k) + \lambda\vec{E}(k)_S$$

$$\lambda = \frac{n'\cos\varepsilon' - n\cos\varepsilon}{n' - n}$$

$$\vec{E}' = \begin{pmatrix} E'_{kx} \\ E'_{(k-1)x,y} \\ \ldots \\ E'_{ky} \end{pmatrix} \quad \vec{E} = \begin{pmatrix} E_{kx} \\ E_{(k-1)x,y} \\ \ldots \\ E_{ky} \end{pmatrix} \quad \vec{E}_S = \begin{pmatrix} E_{Skx} \\ E_{S(k-1)x,y} \\ \ldots \\ E_{Sky} \end{pmatrix}$$

$$C' = \begin{pmatrix} c'_{1,1} & \ldots & \ldots & c'_{1,k+1} \\ \vdots & \vdots & \vdots & \vdots \\ \vdots & \vdots & \vdots & \vdots \\ c'_{k+1,1} & \ldots & \ldots & c'_{k+1,k+1} \end{pmatrix} \quad c'_{i,j} = \begin{cases} 0 & i \neq j \\ \cos^{i-1}\varepsilon' & \text{für } i = j \end{cases}$$

$$C = c_{i,j} = \begin{cases} 0 & i \neq j \\ \cos^{i-1}\varepsilon & \text{for } i = j \end{cases}$$

If higher-order aberrations are taken into account, in two dimensions, imaging properties in the case of several errors are preferably determined as follows:

$$C'\vec{E}(k)' = C\vec{E}(k) + \lambda\vec{E}(k)_S + \vec{Z}$$

$$\lambda = \frac{n'\cos\varepsilon' - n\cos\varepsilon}{n' - n}$$

For example for coma:

$$C'\vec{K}' = C\vec{K} + \lambda\vec{K}_S + \vec{Z}$$

$$\lambda = \frac{n'\cos\varepsilon' - n\cos\varepsilon}{n' - n}$$

$$\vec{K}' = \begin{pmatrix} K'_{xxx} \\ K'_{xxy} \\ K'_{xyy} \\ K'_{yyy} \end{pmatrix} \quad \vec{K} = \begin{pmatrix} K_{xxx} \\ K_{xxy} \\ K_{xyy} \\ K_{yyy} \end{pmatrix} \quad \vec{K}_S = \begin{pmatrix} K_{Sxxx} \\ K_{Sxxy} \\ K_{Sxyy} \\ K_{Syyy} \end{pmatrix}$$

$$C' = \begin{pmatrix} 1 & 0 & 0 & 0 \\ 0 & \cos\varepsilon' & 0 & 0 \\ 0 & 0 & \cos^2\varepsilon' & 0 \\ 0 & 0 & 0 & \cos^3\varepsilon' \end{pmatrix} \quad C = \begin{pmatrix} 1 & 0 & 0 & 0 \\ 0 & \cos\varepsilon & 0 & 0 \\ 0 & 0 & \cos^2\varepsilon & 0 \\ 0 & 0 & 0 & \cos^3\varepsilon \end{pmatrix}$$

$$\vec{Z} = \begin{pmatrix} Z_{xxx} \\ Z_{xxy} \\ Z_{xyy} \\ Z_{yyy} \end{pmatrix}$$

$$Z_{xxx} = 2\tan\varepsilon'\lambda D_{xx}\left(\frac{D_{xy}}{n' - n} - \frac{S_{xy}}{n}\right)$$

$$Z_{xxy} = 3\frac{\sin\varepsilon'}{n'}\left(\frac{\left(\frac{n'}{n}S_{xx}\right)^2 - (\lambda D_{xx} + S_{xx})^2 +}{\frac{n'^2\cos^2\varepsilon' - n^2\cos^2\varepsilon}{\cos^2\varepsilon'}\left(\frac{D_{xy}}{n' - n} - \frac{S_{xy}}{n}\right)^2}\right)$$

-continued $$Z_{xyy} = 6\tan\varepsilon' \lambda D_{xy}\left(\frac{D_{yy}}{n'-n} - \cos\varepsilon \frac{S_{yy}}{n}\right)$$

$$Z_{yyy} = \frac{\sin\varepsilon'}{n'}\left(\frac{n'^2\cos^2\varepsilon' - n^2\cos^2\varepsilon'}{\cos^2\varepsilon'}\left(\cos\varepsilon\frac{S_{yy}}{n} - \frac{D_{yy}}{n'-n}\right)^2 + \cos^2\varepsilon\frac{n'^2}{n^2}S_{xy}^2 - (\cos\varepsilon S_{xy} + \lambda D_{xy})^2\right)$$

In a preferred embodiment, the individual aberrations have specific dependences. The following gives an overview of the relations of the properties of the emerging or outgoing wavefront in dependence on properties of the arriving or incoming or incident wavefront and/or the refractive surface and/or surfaces in the refraction plane(s) up to the $6^{th}$ order (Sec.Sph.Aberr.). For one property each of the outgoing wavefront, the following tables show preferred combination of aberrations of the incoming wavefront and/or refractive surface. Each line of the table represents a possible combination. A zero means that the incoming wavefront and/or refractive surface does not possess this property, a plus (+) means that the incoming wavefront and/or refractive surface possesses this property and that this property also influences the represented property of the outgoing wavefront, and a plus in brackets ((+)) means that the incoming wavefront and/or refractive surface possesses this property, but this property preferably does not influence the represented property of the outgoing wavefront. In the left column, the properties of the incoming wavefront or refractive surface are listed, which influence the represented properties of the outgoing wavefront.

Refractive power:

| outgoing wavefront | incoming wavefront/refractive surface | |
|---|---|---|
| refractive power | angle of incidence e | refractive power D |
| 0 | (+) | 0 |
| D | 0 | + |
| e, D | + | + |

The refractive power of the incoming wavefront and/or refractive surface always influences the refractive power of the outgoing wavefront.

Coma:

| outgoing wavefront | incoming wavefront/refractive surface | | |
|---|---|---|---|
| coma | angle of incidence e | refractive power D | coma K |
| 0 | (+) | 0 | 0 |
| 0 | 0 | (+) | 0 |
| K | 0 | 0 | + |
| e, D | + | + | 0 |
| e, K | + | 0 | + |
| K | 0 | (+) | + |
| e, D, K | + | + | + |

The coma of the incoming wavefront and/or refractive surface always influences the coma of the outgoing wavefront. However, the refractive power only influences the coma of the outgoing wavefront if the wavefront is incident in an oblique manner.

Spherical aberration:

| outgoing wavefront sph. aberration | incoming wavefront/refractive surface | | | |
|---|---|---|---|---|
| | angle of incidence e | refractive power D | coma K | sph. aberration SA |
| 0 | (+) | 0 | 0 | 0 |
| D | 0 | + | 0 | 0 |
| 0 | 0 | 0 | (+) | 0 |
| SA | 0 | 0 | 0 | + |
| e, D | + | + | 0 | 0 |
| 0 | (+) | 0 | (+) | 0 |
| e, SA | + | 0 | 0 | + |
| D | 0 | + | (+) | 0 |
| D, SA | 0 | + | 0 | + |
| SA | 0 | 0 | (+) | + |
| e, D, K | + | + | + | 0 |
| e, D, SA | + | + | 0 | + |
| e, SA | + | 0 | (+) | + |
| D, SA | 0 | + | (+) | + |
| e, D, K, SA | + | + | + | + |

The spherical aberration of the incoming wavefront and/or refractive surface always influences the spherical aberration of the outgoing wavefront. The coma of the incoming wavefront and/or refractive surface only influences the spherical aberration of the outgoing wavefront in connection with refractive power and oblique incidence. The refractive power of the incoming wavefront and/or refractive surface always influences the spherical aberration of the outgoing wavefront.

Sec. coma:

| outgoing wavefront sec. coma | incoming wavefront/refractive surface | | | | |
|---|---|---|---|---|---|
| | angle of incidence e | refractive power D | coma K | sph. aberration SA | sec. coma SecK |
| 0 | (+) | 0 | 0 | 0 | 0 |
| 0 | 0 | (+) | 0 | 0 | 0 |
| 0 | 0 | 0 | (+) | 0 | 0 |
| 0 | 0 | 0 | 0 | (+) | 0 |
| SecK | 0 | 0 | 0 | 0 | + |
| e, D | + | + | 0 | 0 | 0 |
| e, K | + | 0 | + | 0 | 0 |
| 0 | (+) | 0 | 0 | (+) | 0 |
| e, SecK | + | 0 | 0 | 0 | + |
| D, K | 0 | + | + | 0 | 0 |
| 0 | 0 | (+) | 0 | (+) | 0 |
| SecK | 0 | (+) | 0 | 0 | + |
| 0 | 0 | 0 | (+) | (+) | 0 |
| SecK | 0 | 0 | (+) | 0 | + |
| SecK | 0 | 0 | 0 | (+) | + |
| e, D, K | + | + | + | 0 | 0 |
| e, D, SA | + | + | 0 | + | 0 |
| e, D, SecK | + | + | 0 | 0 | + |
| e, K | + | 0 | + | (+) | 0 |
| e, K, SecK | + | 0 | + | 0 | + |
| e, SecK | + | 0 | 0 | (+) | + |
| D, K | 0 | + | + | (+) | 0 |
| D, K, SecK | 0 | + | + | 0 | + |
| SecK | 0 | (+) | 0 | (+) | + |
| SecK | 0 | 0 | (+) | (+) | + |
| e, D, K, SA | + | + | + | + | 0 |
| e, D, K, SecK | + | + | + | 0 | + |
| e, D, SA, SecK | + | + | 0 | + | + |
| e, K, SecK | + | 0 | + | (+) | + |
| D, K, SecK | 0 | + | + | (+) | + |
| e, D, K, SA, SecK | + | + | + | + | + |

The sec. coma of the incoming wavefront and/or refractive surface always influences the sec. coma of the outgoing wavefront. The spherical aberration of the incoming wavefront and/or refractive surface only influences the sec. coma of the outgoing wavefront in connection with refractive power and oblique incidence. The coma of the incoming wavefront and/or refractive surface only influences the sec. coma of the outgoing wavefront in connection with refractive power and/or oblique incidence. The refractive power of the incoming wavefront and/or refractive surface only influences the sec. coma of the outgoing wavefront in connection with coma and/or oblique incidence.

Sec, sph. aberration

| outgoing wavefront sec. coma | incoming wavefront/refractive surface ||||||
| --- | --- | --- | --- | --- | --- | --- |
| | angle of incidence e | Refractive power D | coma K | sph. aberr. SA | sec. coma SecK | sec. sph. aberr SecSA |
| 0 | (+) | 0 | 0 | 0 | 0 | 0 |
| D | 0 | + | 0 | 0 | 0 | 0 |
| 0 | 0 | 0 | (+) | 0 | 0 | 0 |
| 0 | 0 | 0 | 0 | (+) | 0 | 0 |
| 0 | 0 | 0 | 0 | 0 | (+) | 0 |
| SecSA | 0 | 0 | 0 | 0 | 0 | + |
| e, D | + | + | 0 | 0 | 0 | 0 |
| 0 | (+) | 0 | (+) | 0 | 0 | 0 |
| 0 | (+) | 0 | 0 | (+) | 0 | 0 |
| 0 | (+) | 0 | 0 | 0 | (+) | 0 |
| e, SecSA | + | 0 | 0 | 0 | 0 | + |
| D, K | 0 | + | + | 0 | 0 | 0 |
| D, SA | 0 | + | 0 | + | 0 | 0 |
| D | 0 | + | 0 | 0 | (+) | 0 |
| D, SecSA | 0 | + | 0 | 0 | 0 | + |
| 0 | 0 | 0 | (+) | (+) | 0 | 0 |
| 0 | 0 | 0 | (+) | 0 | (+) | 0 |
| SecSA | 0 | 0 | (+) | 0 | 0 | + |
| 0 | 0 | 0 | 0 | (+) | (+) | 0 |
| SecSA | 0 | 0 | 0 | (+) | 0 | + |
| SecSA | 0 | 0 | 0 | 0 | (+) | + |
| e, D, K | + | + | + | 0 | 0 | 0 |
| e, D, SA | + | + | 0 | + | 0 | 0 |
| e, D, SecK | + | + | 0 | 0 | + | 0 |
| e, D, SecSA | + | + | 0 | 0 | 0 | + |
| e, K, SA | + | 0 | + | + | 0 | 0 |
| 0 | (+) | 0 | (+) | 0 | (+) | 0 |
| e, SecSA | + | 0 | (+) | 0 | 0 | + |
| D, K, SA | 0 | + | + | + | 0 | 0 |
| D, K | 0 | + | + | 0 | (+) | 0 |
| D, K, SecSA | 0 | + | + | 0 | 0 | + |
| D, SA | 0 | + | 0 | + | (+) | 0 |
| D, SA, SecSA | 0 | + | 0 | + | 0 | + |
| D, SecSA | 0 | + | 0 | 0 | (+) | + |
| 0 | 0 | 0 | (+) | (+) | (+) | 0 |
| SecSA | 0 | 0 | (+) | (+) | 0 | + |
| SecSA | 0 | 0 | (+) | 0 | (+) | + |
| SecSA | 0 | 0 | 0 | (+) | (+) | + |
| e, D, K, SA | + | + | + | + | 0 | 0 |
| e, D, K, SecK | + | + | + | 0 | + | 0 |
| e, D, K, SecSA | + | + | + | 0 | 0 | + |
| e, D, SA, SecK | + | + | 0 | + | + | 0 |
| e, D, SA, SecSA | + | + | 0 | + | 0 | + |
| e, D, SecK, SecSA | + | + | 0 | 0 | + | + |
| e, K, SA | + | 0 | + | + | (+) | 0 |
| e, K, SA, SecSA | + | 0 | + | + | 0 | + |
| e, SecSA | + | 0 | (+) | 0 | (+) | + |
| e, SecSA | + | 0 | 0 | (+) | (+) | + |
| D, K, SA | 0 | + | + | + | (+) | 0 |
| D, K, SA, SecSA | 0 | + | + | + | 0 | + |
| D, K, SecSA | 0 | + | + | 0 | (+) | + |
| D, SA, SecSA | 0 | + | 0 | + | (+) | + |
| SecSA | 0 | 0 | (+) | (+) | (+) | + |
| e, D, K, SA, SecK | + | + | + | + | + | 0 |
| e, D, K, SA, SecSA | + | + | + | + | 0 | + |
| e, D, SecK, SecSA | + | + | 0 | 0 | + | + |
| e, D, SA, SecK, SecSA | + | + | 0 | + | + | + |
| e, K, SA, SecSA | + | 0 | + | + | (+) | + |

-continued

| outgoing wavefront sec. coma | incoming wavefront/refractive surface ||||||
| --- | --- | --- | --- | --- | --- | --- |
| | angle of incidence e | Refractive power D | coma K | sph. aberr. SA | sec. coma SecK | sec. sph. aberr SecSA |
| D, K, SA, SecSA | 0 | + | + | + | (+) | + |
| e, D, K, SA, SecK, SecSA | + | + | + | + | + | + |

The sec. sph. aberration of the incoming wavefront and/or refractive surface always influences the sec. sph. aberration of the outgoing wavefront. The sec. coma of the incoming wavefront and/or refractive surface only influences the sec. sph. aberration of the outgoing wavefront in connection with refractive power and oblique incidence. The sph. aberration of the incoming wavefront and/or refractive surface only influences the sec. sph. aberration of the outgoing wavefront in connection with refractive power and/or coma and oblique incidence.

The coma of the incoming wavefront and/or refractive surface only influences the sec. sph. aberration of the outgoing wavefront in connection with refractive power and/or oblique incidence. The refractive power of the incoming wavefront and/or refractive surface always influences the sec. sph. aberration of the outgoing wavefront.

The higher-order aberrations of the incident wavefront or surface do not influence the lower orders of the outgoing wavefront. For example, the sph. aberration of the incoming wavefront or surface does not influence the sph. power of the outgoing wavefront.

The lower-order aberrations of the incident wavefront or surface (mostly) influence the higher orders of the outgoing wavefront (e.g. the refractive power an the sph. aberration). The refractive power of the surface or incoming wavefront influences all even aberrations of the outgoing wavefront (e.g. sph. aberration and sec. sph. aberration). The refractive power of the surface or incoming wavefront only influences the odd aberrations of the outgoing wavefront in combination with an odd lower-order aberration. It is in particular the coma of the outgoing wavefront the refractive power of the surface or incoming wavefront only influences in combination with oblique incidence of the wavefront, or the secondary coma only in combination with oblique incidence of the wavefront or coma.

The $(k-1)^{th}$ order of the surface or incoming wavefront only influences the $k^{th}$ order of the outgoing wavefront in combination with oblique incidence of the wavefront and refractive power of the surface or incoming wavefront. In particular the coma (k−1=3) of the surface or incoming wavefront only influences the sph. aberration (k=4) of the outgoing wavefront in combination with the refractive power and oblique incidence, or equivalent sph. aberration (k−1) on secondary coma (k).

Further features, advantages and characteristics of preferred embodiments of the invention will become obvious from the following non-limiting examples.

FIG. 12 shows a schematic representation of the physiological and physical model of a spectacle lens in a predetermined position of wear, on which model the individual spectacle lens calculation or optimization is based. It can be seen in FIG. 12 that the rays from an infinitely remote object 84 are all parallel, which is reflected in an even wavefront 86. In contrast, the rays coming from a near object 88 diverge. Correspondingly, the wavefront 90 is curved. Now, the spectacle lens, which has a preferably spherical front surface 92 and an individually calculated, progressive, atoric rear surface 94, has to make sure that each wavefront 96, 98 on the eye side is preferably curved such that the corresponding object 84, 88 is sharply imaged on the retina of the eye 100. Ideally, these wavefronts have to be curved equally for all directions of sight.

For the calculation of the spectacle lens, use is preferably made of a flexible surface design of the progressive surface to be calculated individually, having a plurality of evaluation points (preferably more than 7000 evaluation points), wherein each of these evaluation points is assigned its own local wavefront tracing. Preferably, the individual progressive surface is optimized by minimizing a target function evaluated at the evaluation points and by taking the physiological vision model into account. In this manner, it is possible to perform the optimization of a spectacle lens according to the variable target function by means of individual wavefront tracings very quickly and thus online after receipt of order.

The calculation of the spectacle lens preferably comprises an optimization with more than 2000 optimization parameters in a highly dimensional space. Multiprocessor mainframe computers can be used for the thus performed real-time online optimization.

Preferably, in the individual optimization of the spectacle lens, not only aberrations of low order (sphere, cylinder, prism), but also aberrations of higher order (e.g. coma and spherical aberration) are minimized. In this respect, reference is made to U.S. Pat. No. 7,063,421 B1. The fabrication of the individually calculated spectacle lens takes place e.g. by means of precision machines, preferably CNC grinding and polishing machines capable of realizing the calculated surface data with a precision in the μm range.

Preferably, in the optimization of the individual spectacle lenses, Listing's rule is particularly taken into account.

The invention claimed is:

1. A method for producing a spectacle lens for a spectacle wearer, comprising:
   a) obtaining individual user data or application data of the spectacle wearer comprising determining at least one higher-order aberration for at least one eye of the spectacle wearer, and
   designing a spectacle lens taking into account the determined at least one higher-order aberration, comprising:
   b) specifying a draft design for the spectacle lens with a plurality of evaluation points;
   c) determining a course of main rays through the plurality of evaluation points;
   d) specifying a local wavefront for each of the main rays in an environment of the respective main ray;
   e) determining optical properties of the spectacle lens at the evaluation points by determining an influence of the spectacle lens on the local wavefronts in an environment of the respective evaluation point, wherein the determined optical properties comprise
   an astigmatism $A_{lens}(i)$ of the spectacle lens at the evaluation point i, which deviates from the astigmatic power required by the user data for a fullcorrection by a residual astigmatism $A_{actual}(i)$,
   a dioptric power $D_{lens}(i)$ of the spectacle lens at the evaluation point i, which deviates from the dioptric power required by the user data for a fullcorrection by a residual power $D_{actual}(i)$, and
   at least one value $Z_{lens}(i)$ of a quantity of a higher-order aberration of the spectacle lens at the evaluation point i, which deviates from the correction power required by the user data for a fullcorrection by a residual aberration $Z_{actual}(i)$,
   f) evaluating the draft design depending on the determined optical properties and the individual user data,
   wherein for each evaluation point, a value $A_{target}(i)$ of a faulty correction of the astigmatism, a value $D_{target}(i)$ of a faulty correction of the dioptric power, and a value $Z_{target}(i)$ of a faulty correction for the at least one higher-order aberration are specified, and
   wherein the draft of the spectacle lens is modified with a minimization of a target function $$F = \sum_i g_A(i) \cdot (A_{actual}(i) - A_{target}(i))^2 + g_D(i) \cdot (D_{actual}(i) - D_{target}(i))^2 + g_Z(i) \cdot (Z_{actual}(i) - Z_{target}(i))^2$$

in mind, wherein weighting functions g are provided; and
   g) fabricating the spectacle lens according to the determined design.

2. The method according to claim 1, further comprising modifying the draft design depending on the determined optical properties and the individual user data; and repeating steps c) to f) on the basis of the modified draft design.

3. The method according to claim 1, wherein in the case of a positive evaluation of the draft design, same is specified as the design for the spectacle lens.

4. The method according to claim 1, wherein the individual user data or application data of the spectacle wearer comprises optical correction data of a visual defect of the spectacle wearer and data of wear relating to an individual positioning of the spectacle lens for the spectacle wearer and/or relating to an individual visual task of the spectacle wearer.

5. The method according to claim 1, wherein specifying a draft design for the spectacle lens comprises specifying a coordinate system and presenting at least one starting surface of the spectacle lens in the coordinate system at least partly by coefficients on which the at least one starting surface only depends locally.

6. The method according to claim 1, wherein specifying a draft design comprises presenting at least one starting surface of the spectacle lens by B-spline functions.

7. The method according to claim 1, wherein the plurality of evaluation points comprises at least 1000, preferably at least 2000, more preferably at least 5000, particularly preferably at least 10000, most preferably at least 20000 evaluation points.

8. The method according to claim 1, wherein each main ray is assigned an object distance depending on the obtained user data, and wherein the local wavefront is specified depending on the object distance assigned to the respective main ray.

9. The method according to claim 1, wherein determining optical properties of the spectacle lens at the evaluation points comprises determining a spherical power and/or astigmatism and/or a coma and/or a spherical aberration and/or a trefoil.

10. The method according to claim 1, wherein determining the course of the plurality of main rays comprises determining penetration points and penetration angles of the main rays through the spectacle lens surfaces, and wherein determining the influence of the spectacle lens on the local wavefronts comprises:
   determining the oblique thickness of the lens along the respective main rays in the spectacle lens;

determining the curvatures of the object-side wavefronts; and determining the main curvatures and directions of the spectacle lens surfaces at the penetration points.

11. The method according to claim 1, wherein evaluating the draft design comprises evaluating a target function depending on the determined optical properties, and the draft design is modified with a minimization of the target function in mind.

12. The method according to claim 1, wherein for each evaluation point, the residual astigmatism is calculated by means of the cross-cylinder method from the astigmatism of the spectacle lens and an astigmatism of an eye of a spectacle wearer comprised by the individual user data.

13. The method according to claim 1, wherein determining higher-order aberrations comprises determining an aberration function, in particular an aberration function $W_A(r)$ depending only on the radial distance r from the pupil center, for the at least one eye of the spectacle wearer.

14. The method according to claim 13, wherein the aberration function W(r) for the at least one eye is expanded in terms of powers of the distance r from the pupil center according to $$W_A(r) = \sum_i \frac{S_i}{i!} r^i = S_1 * r + \frac{S_2}{2} * r^2 + \frac{S_3}{6} * r^3 + \frac{S_4}{24} * r^4 \ldots .$$

15. The method according to claim 1, wherein the act of designing a spectacle lens comprises specifying an aberration function of the spectacle lens on the basis of the aberration function of the eye.

16. The method according to claim 15, wherein specifying the aberration function $W_G(R)$ of the spectacle lens as a function of a distance R from a centration point of the spectacle lens comprises scaling the aberration function $W_A(R)$ of the eye by substituting a distance $$R \cdot \frac{R_P}{R_t}$$

for the distance r, with a pupil radius $R_p$ for the at least one eye of the spectacle wearer and a transformation radius $R_t$ that is greater than the pupil radius $R_p$ and not larger than the radius $R_{G,max}$ of the largest circle around the centration point of the spectacle lens, which comprises at least one point of the spectacle lens.

17. The method according to claim 1, wherein the local wavefronts are represented with Zernike polynomials and/or a Taylor series.

18. The method according to claim 1, further comprising specifying a pupillary sensory function for describing a decreasing sensory weighting toward the pupil edge, and specifying a set of orthogonal functions for the representation of the local wavefronts taking the pupillary sensory function into account.

19. A machine-readable storage medium having stored therein computer program product comprising a program code which, when loaded and executed in a computer system, to perform a method according to claim 1.

20. A computer system for designing a spectacle lens, the computer system being configured to perform method steps according to claim 1.

* * * * *